United States Patent [19]

Guissin

[11] Patent Number: 5,442,462

[45] Date of Patent: Aug. 15, 1995

[54] APPARATUS AND METHOD FOR SMOOTHING IMAGES

[75] Inventor: Rami Guissin, Mobile Post Kfar Vitkin, Israel

[73] Assignee: D.V.P. Technologies Ltd., Kfar Vitkin, Israel

[21] Appl. No.: 896,682

[22] Filed: Jun. 10, 1992

[51] Int. Cl.$^6$ ............................................... H04N 1/40
[52] U.S. Cl. .................................... 358/463; 358/455; 358/447
[58] Field of Search ............... 358/445, 446, 464, 447, 358/463, 455, 457, 294, 456, 465, 298, 296, 280, 282, 261.3; 364/521; 382/22, 54, 27, 41, 50, 49; 340/728

[56] References Cited

U.S. PATENT DOCUMENTS

| | | | |
|---|---|---|---|
| 4,751,585 | 6/1988 | Shibazaki | 358/294 |
| 4,792,854 | 12/1988 | Glenn | 358/160 |
| 4,817,180 | 3/1989 | Cho et al. | 382/54 |
| 4,918,633 | 4/1990 | Sullivan | 364/574 |
| 4,945,502 | 7/1990 | Kwon et al. | 364/574 |
| 4,992,961 | 2/1991 | Petersen | 364/521 |
| 5,031,227 | 7/1991 | Raasch et al. | 382/22 |
| 5,131,057 | 7/1992 | Walowit | 382/41 |
| 5,134,495 | 7/1992 | Frazier et al. | 358/298 |

(List continued on next page.)

FOREIGN PATENT DOCUMENTS 2151104 7/1985 United Kingdom .
2243061 10/1991 United Kingdom .

OTHER PUBLICATIONS

Mahesh, B., Song, W. J. and Pearlman, W. A. (1990) "Adaptive Estimators For Filtering Noisy Images", Optical Engineering, vol. 29, No. 5, p. 488.

Guissin, R., (1991) "Adaptive Noise Reduction Using An Edge-Preserving Recursive Smoother", Ninth Kuba International Symposium on Electronics etc.

Chin R. T. and Yeh C. L., (1983) "Quantative Evaluation of Some Edge-Preserving Noise-Smoothing Techniques", Computer Vision, Graphics & Image Processing 23.

Gelb, A. edt. (1974) Applied Optical Estimation, Technical Staff, The Analytic Sciences Corporation, M.I.T. Press, Cambridge, Mass.

Guissen, R., (1988) "Adaptive Dynamic Range Compression For Flir Imagery" SPIE vol. 1038, Sixth Meeting in Israel on Optical Engineering, pp. 299-306.

Raniner, L. R., & Gold. B., (1975) Theory & Application of Digital Signal Processing, Prentic-Hall Inc. Englewood Cliffs, N.J., pp. 205-209.

Pal. S. K. and Majumder, D. K. D., (1986) Fuzzy Mathematical Approach to Pattern Recognition, Ahalsted Press Book, John Wiley & Sons, New York.

Papoulis, A. (1985) "Probability, Random Variables and Stochastic Processes", Mc-Graw-Hill, Kogakusha Ltd.

Nagao, M. & Matsuyama, T., (1979) "Edge Preserving Smoothing", Computer Vision Graphics & Image Processing 9, pp. 394-407.

Astola, J., Heinonen, P. and Neuvo, Y. (1989) "Liner Median Hybrid Filters" IEEE Tranactions on Circuits and Systems, vol. 36, No. 11.

Nahi, N. E. and Habibi, A., (1975) "Decision-Directed Recursive Image Enhancement", IEEE Transactions on Circuits and Systems, vol. Cas-22, No. 3.

Spence, C. S., Pearson, J. C. and Sverdlove, R., (1991)

(List continued on next page.)

Primary Examiner—Paul Ip
Attorney, Agent, or Firm—Ladas & Parry

[57] ABSTRACT

Apparatus for image noise reduction which employs an adaptive, acuity-preserving, multi-directional and multi dimensional smoothing method. The method and apparatus of the present invention are applicable, inter alia, for (a) adaptive spatial noise reduction in still images, (b) adaptive temporal noise reduction in time changing image sequences, and (c) adaptive spatio-temporal noise reduction by combining the first two approaches (a) and (b).

32 Claims, 10 Drawing Sheets

U.S. PATENT DOCUMENTS

| | | | |
|---|---|---|---|
| 5,142,537 | 8/1992 | Kutner | 371/31 |
| 5,157,491 | 10/1992 | Kassatly | 358/146 |
| 5,201,013 | 4/1993 | Kumagai | 358/456 |
| 5,270,728 | 12/1993 | Lund et al. | 346/1.1 |
| 5,293,579 | 3/1994 | Stockholm | 358/447 |
| 5,301,038 | 4/1994 | Todd | 358/455 |
| 5,337,159 | 8/1994 | Iida et al. | 358/447 |

OTHER PUBLICATIONS

"Artificial Neural Networks As TV Signal Processors", SPIEProceedings, vol. 1469.

Lubin, J., (1991) "Adaptive Coring Techniques For Spatio—Temporal Signals", IEEE Workshop on Visual Motion, Princeton, N.J.

Habibi, A., (1972) "Two Dimensional Bayesian Estimate of Images", Proceedings of the IEEE, vol. 66, pp. 878–883.

Kurono, T., Kawashima, T., Katoh, M., Inzuka, E. and Tsuchiya, Y., (1985) "Image Processing On Photon—Counting Imaging", SPIE, vol. 575.

Hanaizumi, H. et al, (1984) "A Nonliner and Adaptive Algorithm . . . ", Proc. of The 1984 Inter. Symposium on Noise and Clutter Rejection in Radars . . .

Powell, P. G. and Bayer, B. E., (1982) "A Method For Tha Digital Of Unsharp . . . ", IEE Inter. Conf. on Electronic Image Processing. Conf. Pyb, 214.

Lloyd, R. O. et al, (1982) "Image Transform Modelled On Visual . . . ", IEE Inter. Conf. On Electronic Image Processing, Conf Pub. 214.

Saint-Mark, P. et al, (1989) "Adaptive Smoothing: A General Tool For Early Vision", Proc. IEEE Computer Vision and Pattern Reuquition.

Nahi, W. E., "Recusi Estimation in Image Enhancement", Proceedings of the IEEE, vol. 60, No. 7.

"Moving Average To Decrease Noise", Real Time Video Image Processing, Quantex Corporation.

APPARATUS AND METHOD FOR SMOOTHING IMAGES

FIELD OF THE INVENTION

The present invention relates to apparatus and methods for smoothing images and reducing noise.

BACKGROUND OF THE INVENTION

A known problem is digital image noise reduction in the face of (a) randomly distributed noise, which is often additive, (b) fixed pattern noise due to imaging detector response non-uniformities, and (c) analog recording noise of video signals due to video standard bandwidth limitations and luminance/chrominance signal formats.

The need for image restoration in the face of noise exists in a wide range of applications such as electronic imaging and scanning, video recording equipment, analog and digital TV displays, and digital image compression. Imaging sensors such as CCD-TV continuous and still cameras and medical imaging systems often face low light level situations, in which the image quality deteriorates due to reduced signal to noise ratios. Significant amplification of such video signals amplifies the various noise effects to the point where they are visible and disturbing to the observer. Electronic noise in still-video images is usually perceived as high frequency noise. In image sequences, electronic noise fluctuates randomly due to its random statistical nature, and can therefore be reduced by temporal integration.

Photo response non-uniformities of imaging detectors, such as CCD imagers, CCD image scanners and image facsimile machines, result in fixed-pattern noise. Its spatial structure depends on the internal design characteristics of the detector. CCD scanner detectors, for example, suffer from fixed-pattern noise caused by non-uniformities in the detector element responsivities. These are only partially correctable using digital calibrated processing schemes, the residual fixed-pattern noise remaining visible.

Fixed-pattern noise is particularly disturbing in still imagery. These effects are usually masked and not visually perceived in high contrast textured images. However, in low light level imaging situations where extensive signal amplification is required in order to perceive low contrasts, the fixed pattern noise effects are clearly visible and disturbing to the observer.

Image noise also appears in medical imaging applications, for example in ultrasound, and in photon-counting imaging systems. Image scanning applications also often require noise reduction, depending on the lighting conditions, and on the type of scanned data (imagery and text on paper or film).

Spatial and spatio-temporal image compression methods such as block transform techniques, often result in two noise artifacts, namely high frequency noise in the vicinity of image edges within each block, and low frequency block noise between adjacent blocks.

Image noise is an important factor which governs the effectiveness of edge detection operations in machine vision applications.

Existing digital image noise reduction techniques can generally be categorized into three classes:

(a) Spatial smoothing operators which utilize only spatial image information for reducing image noise, (b) temporal image integration operators which prolong the effective exposure time of an image changing over time hence reducing temporal random fluctuations of image noise, and (c) combinations of the techniques (a) and (b).

Linear spatial smoothing operators, such as low pass filters, usually result in subjectively unacceptable blurring of essential high frequency image detail such as edges, lines and contours. More advanced filtering techniques such as Wiener filters adapt to local estimates of signal and noise according to statistical models of the signal noise processes, which are often difficult to define a-priori. This type of technique is discussed in a document referenced herein as Document 1 of Appendix A.

A Wiener filter is an example of a more general class of filters known as Kalman filters, described in Documents 2 and 4 of Appendix A. Kalman filters require more intensive computation for local estimation of second order statistical parameters in the image. Kalman filtering techniques also rely on signal and noise models which are generally not appropriate for all images.

Other operators, such as median filters, do not require any a-priori knowledge of signal and noise models, and are designed to preserve high frequency edge signals while at the same time reducing the noise in smooth image regions. However, such operators introduce unwanted image noise effects due to the statistical nature of their pixel replication. This type of operator is discussed in Document 3 of Appendix A and is compared there to other edge preserving operators.

Temporal image noise is often reduced by image integration techniques, for example by use of recursive running-average filtering techniques, which are discussed in Documents 4 and 6 of Appendix A. However, in situations where motion occurs in the image, due to camera motion and/or motion of an object in the scene, high frequency image detail is usually compensated and blurred due to the prolonged effective exposure time. Therefore, such methods are unsuitable for many applications.

Two-directional low pass filtering techniques are discussed in Document 5 of Appendix A in the context of dynamic range compression of images.

A theoretical and more general treatment of two-directional filtering of images is provided in Document 6 of Appendix A. However, the described techniques do not provide visually pleasing results.

Heuristic techniques using fuzzy logic formulations have been applied to noise reduction problems with limited success, as explained in Document 7 of Appendix A.

SUMMARY OF THE INVENTION

The present invention seeks to provide apparatus for image noise reduction which employs an adaptive, acuity-preserving, multi-directional and multi dimensional smoothing method. The method and apparatus of the present invention are applicable, inter alia, for (a) adaptive spatial noise reduction in still images, (b) adaptive temporal noise reduction in time changing image sequences, and (c) adaptive spatio-temporal noise reduction by combining the first two approaches (a) and (b).

The image noise effects which may be reduced using the apparatus of the present invention include random photon and electronic noise, fixed pattern noise, and analog recording noise from a source such as video equipment. In spatial smoothing applications, the present invention utilizes one-directional and two-directional filtering schemes, which employ adaptive weighting of noisy measurements determined by easily computed pixel-based signal to noise measures, and preferably also utilizes precomputed steady state Kalman filter estimation gain parameters.

The signal to noise measures employed by the present invention are designed to discriminate, in the presence of noise-induced uncertainties, between occurrences of (a) edge signals, (b) line and contour signals, and (c) smooth brightness signals. In smooth image regions, also termed small uncertainties, extensive smoothing results in a dramatic reduction in image noise. In other locations where edge and line occurrences are hypothesized (high uncertainties), smoothing is minimized so as to avoid blurring of sharp image features.

The spatial smoothing scheme of the present invention combines one-directional and two-directional adaptive filtering methods in a variety of one- and two-dimensional processing configurations. The configurations shown and described herein allow iterated computations in the presence of excessive noise, and may be implemented in various real-time imaging and scanning applications using an efficient pipeline architecture. When temporally smoothing image sequences, the same adaptive weighting schemes may be applied in the time domain, resulting in adaptive, running-average image integration configurations. The spatial and temporal noise reduction schemes may also be combined in spatio-temporal smoothing configurations by combining, for example, two-directional current image estimates and accumulated estimates of previous images.

The image noise reduction method provided by the current invention provides effective noise reduction solutions both spatially and temporally. The present invention seeks to provide a general method of adaptive image smoothing, which can be adapted with a high degree of flexibility and on a pixel-by-pixel basis, according to a simple local signal and noise measure.

In accordance with the present invention, extensive smoothing is applied to certain image regions without degrading image quality as perceived by the human visual system. Appropriate adaptation of the smoothing mechanism is provided in transition areas between differently characterized image regions, so that abrupt brightness changes or edges are preserved without introducing unwanted visible noisy edge effects.

The proposed method utilizes adaptive one-directional and two-directional processing to extract, on a pixel-by-pixel basis, a criterion which determines a smoothing procedure suitable for the pixel signal and noise behavior. The intermediate results of the one-directional and two-directional processing may then be combined in any of various one- and two-dimensional spatial processing configurations, and three-dimensional spatio-temporal processing configurations disclosed herein.

A preferred embodiment of the present invention employs Kalman filter theory to provide an estimation gain parameter, as explained in detail below. Kalman filter theory is discussed in Document 4 of Appendix A. Alternatively, heuristic approaches may be employed to provide the estimation gain parameter, such as fuzzy logic theory, discussed in Document 7 in Appendix A.

The present invention seeks to provide an effective method for adaptive noise reduction in electronic images. The method incorporates an adaptive smoothing technique which determines, at each pixel in the image, the most suitable weighting of the current pixel measurement and its recursively computed estimates of neighboring pixels. The recursively computed estimates of neighboring pixels are determined by one-directional and two-directional estimation filtering processes. Neighboring pixels are each estimated on the basis of a different set of pixels. The sets are respectively arranged along different directions relative to the current pixel.

Recursive estimates of adjoining pixels in the one- and two-directional methods may be computed adaptively by means of a simply computed image intensity signal to noise measure. A locally computed edge signal measure normalized by an estimated image noise measure such as a standard deviation estimate provides an indication of pixel signal to noise ratio. The per-pixel computed signal to noise ratio is preferably employed to select a smooth weighting function which is suitable for each of the following: (a) edge signals, (b) lines and contours, and (c) smooth surfaces.

An adaptive weighting function is computed recursively a-priori for a range of signal-to-noise ratio values, preferably employing a simplified, steady state, Kalman filter estimation gain parameter formulation. The result of the operation of the Kalman filter may be stored in lookup tables for rapid, easy access. If fuzzy logic methods are used instead of Kalman filters, the adaptive weights stored in the lookup tables may be termed "membership functions" as discussed in Document 7 in Appendix A.

The one-directional and two-directional estimation techniques shown and described herein may be extended to multi-directional processing. Also, the embodiments shown and described herein may be extended to operate in two and three spatial dimensions, where previously smoothed pixels in adjoining image pixels and lines are incorporated in the smoothing process. Two- and three-dimensional, spatio-temporal noise reduction processing methods are also disclosed which combine previously smoothed images, such as video sequences with a spatially smoothed current image in order to provide a good quality estimate of the current image in the presence of uncertainties due to noise and motion.

The method of the present invention is applicable to a variety of image processing applications, including image enhancement, dynamic range compression, coding and compression, interpolation and electronic zoom, and edge detection applications.

A particular feature of the image smoothing devices shown and described herein is that the output therefrom is generally nonlinear relative to the input thereto.

One embodiment of the present invention is described in Appendix B, appended hereto. Other preferred embodiments of the present invention are described herein with reference to FIGS. 1-13.

In accordance with a preferred embodiment of the present invention, there is provided a method for acuity-preserving image smoothing including the steps of proceeding along a first dimension of received image pixels in a first direction and computing a first sequence of estimated pixel values from the received image pixels defined along the first direction, proceeding along the first dimension of received image pixels in a second opposite direction and computing a second sequence of estimated pixel values defined along the second direction, and comparing, for each individual pixel along the first dimension, an adjacently preceding estimated pixel value in the first sequence of estimated pixel values to an adjacently preceding estimated pixel value in the second sequence of estimated pixel values, thereby to compute an improved estimated pixel value for the individual pixel.

Further in accordance with a preferred embodiment of the present invention, the step of proceeding and computing includes, for an individual pixel in the first sequence, the steps of computing a difference value between the received image pixel and an adjacently preceding estimated pixel value in the first sequence, employing the received image pixel and at least one preceding estimated pixel values in the first sequence to estimate a first directional signal to noise ratio, generating an adjusted difference value to reflect the first directional signal to noise ratio, and employing the adjusted difference value to update an adjacently preceding estimated pixel value, thereby to compute the estimated pixel value of the individual pixel.

Further in accordance with a preferred embodiment of the present invention, the step of comparing includes the steps of computing a difference value between the received image pixel and a function of adjacently preceding estimated pixel values in the first and second sequences, employing preceding estimated pixel values in the first and second sequences to estimate a two-directional signal to noise ratio, adjusting the difference value to reflect the signal to noise ratio, and employing the adjusted difference value to update a function of adjacently preceding estimated pixel values in the first and second sequences, thereby to compute the improved estimated pixel value of the individual pixel.

Still further in accordance with a preferred embodiment of the present invention, the step of comparing includes the step of comparing the adjacently preceding estimated pixel values in the first and second sequences to at least one of the following parameters of the individual location: the estimated pixel value in the first sequence corresponding to the individual pixel, the estimated pixel value in the second sequence corresponding to the individual pixel, and the received image pixel.

Additionally in accordance with a preferred embodiment of the present invention, the method includes the steps of repeating, for at least a second dimension of received image pixels, the steps of proceeding in first and second directions and the step of comparing, thereby to compute at least one additional improved estimated pixel value for each individual pixel, and combining the at least two improved estimated pixel values, thereby to obtain a further improved two-dimensional estimated pixel value.

Further in accordance with a preferred embodiment of the present invention, the second dimension includes a time dimension.

Still further in accordance with a preferred embodiment of the present invention, the method includes the steps of proceeding along a second dimension of received image pixels in a first direction and computing a first sequence of second dimension estimated pixel values from the improved estimated pixel values of the first dimension, proceeding along the second dimension of received image pixels in a second opposite direction and computing a second sequence of second dimension estimated pixel values from the improved estimated pixel values of the first dimension, and comparing, for each individual pixel along the second dimension, an adjacently preceding second dimension estimated pixel value in the first sequence of second dimension estimated pixel values and an adjacently preceding second dimension estimated pixel value in the second sequence of second dimension estimated pixel values, thereby to compute a further improved estimated pixel value for the individual pixel.

Additionally in accordance with a preferred embodiment of the present invention, the received image defines a second dimension thereof and a scanning direction in which the image is received along the second dimension, and the method also includes the steps of proceeding along the second dimension of received image pixels in the scanned direction and computing a sequence of second dimension estimated pixel values from the improved estimated pixel values of the first dimension, and comparing, for each individual pixel along the second dimension, an adjacently preceding second dimension estimated pixel value in the sequence of second dimension estimated pixel values and an improved estimated pixel value of the first dimension which adjacently proceeds the individual pixel along the second dimension, thereby to compute a further improved estimated pixel value for the individual pixel.

Further in accordance with a preferred embodiment of the present invention, the method includes the step of adjusting the results of the second dimension steps in order to reflect the difference between the received image and results of the first dimension steps.

Still further in accordance with a preferred embodiment of the present invention, the method also includes the step of scanning an image using an electronic scanner, thereby to define the received image pixels.

Additionally in accordance with a preferred embodiment of the present invention, the method also includes the step of receiving the received image pixels from a video system.

There is also provided in accordance with a preferred embodiment of the present invention apparatus for acuity-preserving image smoothing including apparatus for proceeding along a first dimension of received image pixels in a first direction and for computing a first sequence of estimated pixel values from the received image pixels defined along the first direction, apparatus for proceeding along the first dimension of received image pixels in a second opposite direction and for computing a second sequence of estimated pixel values defined along the second direction, and apparatus for comparing, for each individual pixel along the first dimension, an adjacently preceding estimated pixel value in the first sequence of estimated pixel values to an adjacently preceding estimated pixel value in the second sequence of estimated pixel values, thereby to compute an improved estimated pixel value for the individual pixel.

Further in accordance with a preferred embodiment of the present invention, the apparatus for proceeding and computing includes, for an individual pixel in the first sequence, apparatus for computing a difference value between the received image pixel and an adjacently preceding estimated pixel value in the first sequence, apparatus for employing the received image pixel and at least one preceding estimated pixel values in the first sequence to estimate a first directional signal to noise ratio, apparatus for generating an adjusted difference value to reflect the first directional signal to noise ratio, and apparatus for employing the adjusted difference value to update an adjacently preceding estimated pixel value, thereby to compute the estimated pixel value of the individual pixel.

Still further in accordance with a preferred embodiment of the present invention, the apparatus for comparing includes apparatus for computing a difference value between the received image pixel and a function of adjacently preceding estimated pixel values in the first and second sequences, apparatus for employing preceding estimated pixel values in the first and second sequences to estimate a two-directional signal to noise ratio, apparatus for adjusting the difference value to reflect the signal to noise ratio, and apparatus for employing the adjusted difference value to update a function of adjacently preceding estimated pixel values in the first and second sequences, thereby to compute the improved estimated pixel value of the individual pixel.

Still further in accordance with a preferred embodiment of the present invention, the apparatus for comparing includes apparatus for comparing the adjacently preceding estimated pixel values in the first and second sequences to at least one of the following parameters of the individual location: the estimated pixel value in the first sequence corresponding to the individual pixel, the estimated pixel value in the second sequence corresponding to the individual pixel, and the received image pixel.

Further in accordance with a preferred embodiment of the present invention, the image smoothing apparatus includes apparatus for proceeding, for at least a second dimension of received image pixels, in first and second directions in order to compute first and second sequences, respectively, of estimated pixel values and for comparing adjacently preceding estimated pixel values in the first and second sequences, thereby to compute at least one additional improved estimated pixel value for each individual pixel, and apparatus for combining the at least two improved estimated pixel values, thereby to obtain a further improved two-dimensional estimated pixel value.

Still further in accordance with a preferred embodiment of the present invention, the second dimension is a time dimension.

Additionally in accordance with a preferred embodiment of the present invention, the image smoothing apparatus includes apparatus for proceeding along a second dimension of received image pixels in a first direction and for computing a first sequence of second dimension estimated pixel values from the improved estimated pixel values of the first dimension, apparatus for proceeding along the second dimension of received image pixels in a second opposite direction and for computing a second sequence of second dimension estimated pixel values from the improved estimated pixel values of the first dimension, and apparatus for comparing, for each individual pixel along the second dimension, an adjacently preceding second dimension estimated pixel value in the first sequence of second dimension estimated pixel values and an adjacently preceding second dimension estimated pixel value in the second sequence of second dimension estimated pixel values, thereby to compute a further improved estimated pixel value for the individual pixel.

Additionally in accordance with a preferred embodiment of the present invention, the received image defines a second dimension thereof and a scanning direction in which the image is received along the second dimension and the image smoothing apparatus also includes apparatus for proceeding along the second dimension of received image pixels in the scanned direction and for computing a sequence of second dimension estimated pixel values from the improved estimated pixel values of the first dimension, and apparatus for comparing, for each individual pixel along the second dimension, an adjacently preceding second dimension estimated pixel value in the sequence of second dimension estimated pixel values and an improved estimated pixel value of the first dimension which adjacently proceeds the individual pixel along the second dimension, thereby to compute a further improved estimated pixel value for the individual pixel.

Further in accordance with a preferred embodiment of the present invention, the image smoothing apparatus includes apparatus for adjusting the results of the second dimension steps in order to reflect the difference between the received image and results of the first dimension steps.

Still further in accordance with a preferred embodiment of the present invention, the image smoothing apparatus also includes an electronic scanner for scanning an image, thereby to provide the received image pixels.

Additionally in accordance with a preferred embodiment of the present invention, the image smoothing apparatus also includes a video system for providing the received image pixels.

There is also provided in accordance with another preferred embodiment of the present invention apparatus for one-directional time domain smoothing of a current image which was preceded by a sequence of images, the apparatus including apparatus for computing a difference function between the raw value of an individual pixel of the current image and a smoothed value corresponding to at least one pixels of at least one preceding image, and apparatus for generating a smoothed pixel value for the individual pixel of the current image by computing a weighted sum of the smoothed value and of the raw value of the individual pixel of the current image wherein the weights are a function of the difference function.

There is also provided in accordance with another preferred embodiment of the present invention a method for one-directional time domain smoothing of a current image which was preceded by a sequence of images, the method including the steps of computing a difference function between the raw value of an individual pixel of the current image and a smoothed value corresponding to at least one pixels of at least one preceding image, and generating a smoothed pixel value for the individual pixel of the current image by computing a weighted sum of the smoothed value and of the raw value of the individual pixel of the current image wherein the weights are a function of the difference function.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
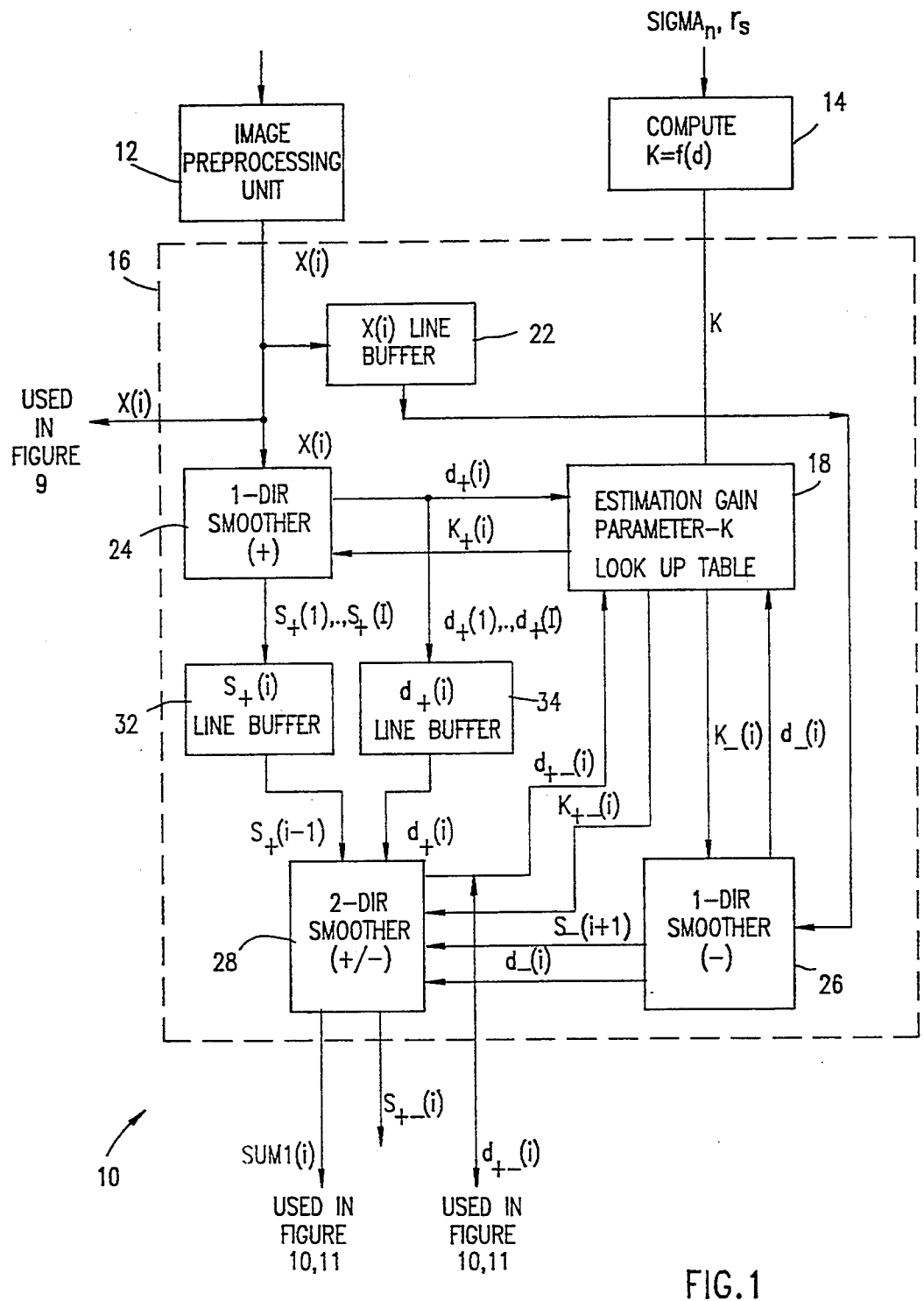
FIG. 1 is a simplified block diagram of one-dimensional two-directional image smoothing apparatus constructed and operative in accordance with a preferred embodiment of the present invention.

Reference is now made to FIG. 1 which is a simplified block diagram of one-dimensional two-directional image smoothing apparatus, referenced generally 10, which is constructed and operative in accordance with a first preferred embodiment of the present invention.

The image smoothing apparatus 10 includes an image preprocessing unit 12, an estimation gain parameter computation unit 14 and a two-directional processor 16 which receives image input from the image preprocessing unit 12 and which includes an estimation gain parameter LUT 18 which is loaded by estimation gain parameter computation unit 14.

Image preprocessing unit 12 is operative to receive analog image data from a suitable device such as a video camera or video recorder and perform an analog to digital conversion of the analog image data. The resulting digital image data may be is stored in a frame buffer if suitable, for example if it is necessary to accommodate a data input rate which differs from the processing rate of the apparatus of FIG. 1. The output of the image preprocessing unit 12, also termed herein "raw image data", is provided, line by line, to a raw data line buffer 22 in two-directional processor 16.

The term "line" as employed in the present specification, refers to a one-dimensional unit of an image, such as an image row, image column, or diagonal one-dimensional array of pixels within the image. Selection of a dimension of the image along which to process preferably takes into account characteristics of the image such as image edges arranged along a particular dimension and characteristics of the noise such as a high probability that noise of a particular statistical character will occur along a particular dimension.

The index "i" is used herein as an index of the pixels within a line (for each line, i=1, ..., I). "X(i)" as used herein denotes the raw data image value for pixel i and includes a signal portion and a noise portion as defined in Equations 1A and 1B of Appendix C. The minimum mean square estimate, S(i), of the signal portion S*(i) of the raw data image is defined by Equation 2 of Appendix C, as discussed in Document 8 of Appendix A.

It is appreciated that a one-dimensional line may be processed in either of two opposite directions. For example, an image row may be processed from right to left or from left to right. An image column may be processed from top to bottom or from bottom to top.

The two-directional processor 16 includes, apart from LUT 18 and raw data line buffer 22, a pair of one-directional smoothing units 24 and 26 and a two-directional smoothing unit 28. Units 24 and 26 smooth the raw image data in raw image line buffer 22, proceeding in first and second opposite directions respectively. Two-directional smoothing unit 28 receives delayed output data from one-directional smoothing unit 24 and 26. Two-directional smoother 28 combines image data which has undergone one-directional smoothing in both the first and second one-directional smoothers by performing a two-directional smoothing process thereupon.

One-directional smoothers 24 and 26 receive raw image data X(i) from image preprocessing unit 12 and from raw data line buffer 22 respectively, and further receive an estimation gain parameter K(i) from a suitable source such as LUT 18. One-directional smoothers 24 and 26 each compute a respective approximation, termed herein $S_+(i)$ and $S_-(i)$ respectively and defined in Equations 3A and 3B respectively of Appendix C, to the minimum mean square error estimate S(i), defined in Equation 2 of Appendix C.

It is a particular feature of the present invention that each one-directional smoother, when computing an estimate $S_+(i)$ or $S_-(i)$, respectively, of the signal portion of the raw image value X(i) of pixel i, employs only information regarding pixel i and pixels preceding i in the direction of smoothing.

Another particular feature of the embodiment of FIG. 1 as well as of the other embodiments shown and described herein with reference to foregoing figures is that the outputs of the image smoothing devices shown and described herein are normally nonlinear relative to the inputs thereto.

For example, for the purposes of simplification, line buffer 22 will be assumed to store image rows, one-directional smoother 24 will be assumed to smooth from left to right and one-directional smoother 26 will be assumed to smooth from right to left. It is appreciated that the above example is not intended to be limiting. In this example, left-to-right smoother 24, when computing an estimate of the signal portion S*(i) of pixel i, employs only the raw image values of pixel i and pixels to the left of pixel i. Left-to-right smoother 24 does not employ raw image values of pixels to the right of pixel i to estimate the signal portion of pixel i. In contrast, right-to-left smoother 26, when computing an estimate of the signal portion of pixel i, employs only the raw image values of pixel i and pixels to the right of pixel. Right-to-left smoother 26 does not employ raw image values of pixels to the left of pixel i to estimate the signal portion of pixel i.

A particular advantage of the above characteristics of one-directional smoothers 24 and 26 is that for each pixel i, the signal estimates $S_+(i)$ and $S_-(i)$ generated by smoothers 24 and 26 respectively are substantially independent of one another. Also, in the present example, $S_+(i)$, the signal estimate of one-directional smoother 24 for pixel i, may be assumed to be "uncontaminated" by image effects occurring to the right of pixel i. Similarly, the signal estimate $S_-(i)$ of one-directional smoother 26 for pixel i may be assumed to be "uncontaminated" by image effects occurring to the left of pixel i.

Equation 3A of Appendix C is a preferred recursive equation which may be employed by one-directional smoother 24 for computing a signal estimate in a first direction for pixel i, $S_+(i)$, using the signal estimate $S_+(i-1)$ of the $(i-1)$th pixel. The $(i-1)$th pixel is the pixel which precedes the current pixel i in the (+) direction of smoothing. Equation 3B is a preferred recursive equation which may be employed by one-directional smoother 26 for computing the signal estimate for pixel i, $S_-(i)$, using the signal estimate $S_-(i+1)$ of the $(i+1)$th pixel. The $(i+1)$th pixel precedes the current pixel i in the (−) direction of smoothing.

In Equations 3A and 3B, $K_+(i)$ and $K_-(i)$ refer respectively to estimation gain parameters provided to one-directional smoothers 24 and 26 respectively by LUT 18. As shown in FIG. 1, smoothers 24 and 26 address LUT 18 by means of the magnitudes of parameters $d_+(i)$ and $d_-(i)$, respectively. These parameters are both generated from the raw image data and each comprise a respective directional estimate of signal strength of an edge at pixel i. $d_+(i)$ and $d_-(i)$ are defined with reference to Equations 3A and 3B of Appendix C.

Preferably, as explained above, estimation gain parameter $K(i)$ is stored in LUT 18 which is constructed by estimation gain parameter computation unit 14. Unit 14 preferably receives two external values, $sigma_n$ and $r_s$. $r_s$ is the correlation coefficient of the signal and is theoretically defined by Equation 2 of Appendix C. $Sigma_n$, the standard deviation, is defined by Equation 1A in the present example, however, it is appreciated that the applicability of the present method extends to a wide variety of noise distributions and is not limited to Gaussian noise distributions. Unit 14 may include means for accepting manual input from a user, in which case $sigma_n$ and $r_s$ may be input by hand.

Any suitable initial value for $r_s$ may be selected by the user, such as a value within the range 0.6–0.8. Any suitable initial value for $sigma_n$ may be selected by the user, such as a value between 0 and 10 gray levels. Once initial values for $r_s$ and $sigma_n$ have been determined, the apparatus of FIG. 1 may be employed as explained herein in order to obtain an output image. Upon viewing the output image, if the user finds the output image to be too smooth or blurry, he may decrease the value of $r_s$ and/or decrease the value of $sigma_n$. If the user views the output image and finds it to be too noisy or choppy, he may increase the value of $r_s$ and/or increase the value of $sigma_n$.

Estimation gain parameter computation unit 14 computes K parameters as a function of d parameters and stores pairs of K and d parameters in estimation gain parameter LUT 18. Estimation gain parameter LUT 18 is addressed by the magnitudes of $d_+$ and $d_-$ values arriving from one-directional smoothers 24 and 26 respectively and computes $K_+$ and $K_-$ parameters which are supplied back to one-directional smoothers 24 and 26 respectively. Estimation gain parameter LUT 18 also provides $K_{+-}$ values to two-directional smoother 28, which are addressed in accordance with the magnitudes of $d_{+-}$ values provided by unit 28, as described in detail below.

Gain estimation parameter computation unit 14 may be implemented in accordance with Equations 4 and 5 of Appendix C, of which equation 4 is a recursive formula and equation 5 is an initial formula with which the recursive process may be initiated.

Preferably, K is computed for each of a plurality of d values, corresponding to a plurality of SNR values, such as all SNR values in a range of 0–100, at a resolution of 0.02–0.1. LUT 18 comprises, therefore, a table of 1000–5000 pairs of d and K values. Since, for each value of d, K reaches a steady state after a relatively small number of recursions, only a single K value need be stored for each d value. A suitable number of iterations of equation 4 may be performed for each d value, such as 25–50 iterations, and the single steady state K value which results may be stored in association with the corresponding d value.

It is appreciated that LUT 18 need not be constructed in accordance with equations 4 and 5. Alternatively, for example, good approximations to the values obtained by using equations 4 and 5 may be generated by linearization and Taylor series expansion. Also, the values obtained by employing equations 4 and 5 or by any other method may be thresholded or otherwise modified in order to avoid computational error due to limited accuracy.

It is believed that the computation of Equations 4 and 5 may be replaced by heuristic methods of generating K such as fuzzy logic methods, in which case the functions stored in LUT 18 would be more appropriately termed "fuzzy membership functions". Fuzzy logic methods are described in Document 7 of Appendix A.

It is also believed that the computation of appropriate K values may be governed by the spatial location of each point in the image. For example, in the case of block transform image coding, different smoothing is desirable along boundaries of adjacent blocks as compared to the smoothing within each individual block. Another example is one where the K values are also governed by the local average of image brightness, such that more significant smoothing may be applied in low brightness image regions as compared to high brightness image regions.

In accordance with a preferred embodiment of the present invention, a second LUT may be provided which, instead of storing pairs of K and d values in LUT 18, stores pairs of K×d and d values, thereby eliminating the need to multiply the K output of the LUT by d when employing Equations 3A and 3B pertaining to smoothers 24 and 26 respectively. The original LUT 18 is preferably retained to subserve smoother 28 which does not employ the product K×d, as shown by Equation 7.

One-directional smoother 24 stores the signal estimate $S_+(i)$ for all pixels i in a signal estimate line buffer 32 which interfaces with two-directional smoother 28. One-directional smoother 24 also stores the $d_+(i)$ values computed for each pixel i in a $d_+(i)$ line buffer 34 which also interfaces with two-directional smoother 28.

Two-directional smoother 28 is operative to receive one-directional signal estimate values $S_+(i-1)$ and one-directional $d_+(i)$ values from one-directional smoother 24, via line buffers 32 and 34 respectively, and also to receive the corresponding one-directional values $S_-(i+1)$ and $d_-(i)$ directly from one-directional smoother 26, which proceeds in the opposite direction relative to one-directional smoother 24. Two-directional smoother 28 computes a two-directional d value, $d_{+-}(i)$, using Equation 6 of Appendix C, which value is used to address LUT 18. The resulting $K_{+-}(i)$ value is employed by two-directional smoother 28 to compute a two-directional signal estimate value, $S_{+-}(i)$, for each pixel i, which is the output of the two-directional processor 16. Equation 7 of Appendix C is a preferred formula for the computation of $S_{+-}$.

Preferably, the output of two-directional smoother 28 also includes the two-directional difference value, $d_{+-}(i)$, as well as a value Sum1(i), defined by Equation 8 of Appendix C, which are useful in certain applications, as described in detail below with reference to FIGS. 10 and 11.

Figure 2:
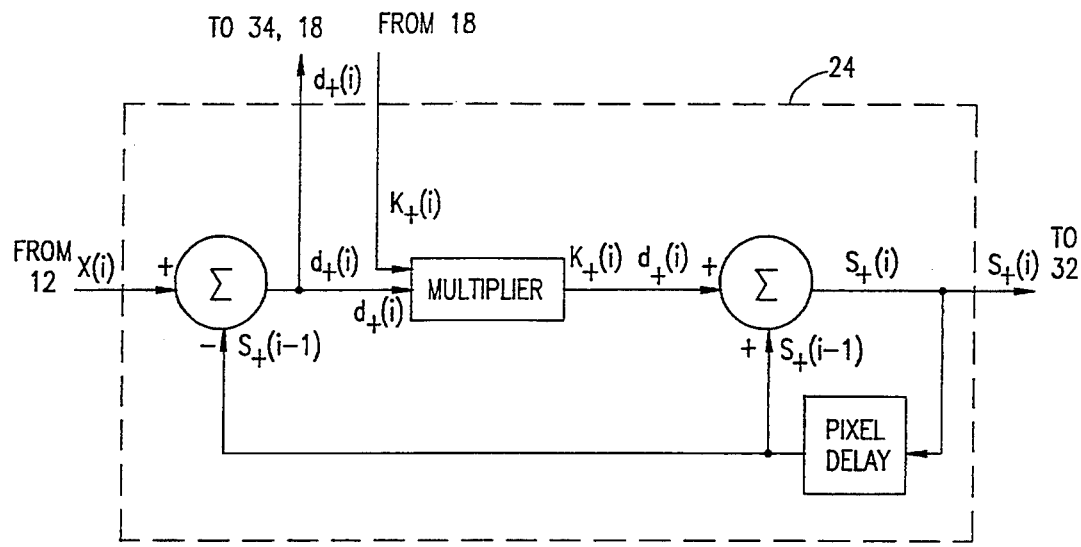
FIG. 2 is a simplified block diagram of one-directional smoothing unit 24 of FIG. 1.

Reference is made briefly to FIG. 2 which is a simplified block diagram of a one-directional smoother, such as one-directional smoother 24 of FIG. 1, constructed and operative in accordance with a preferred embodiment of the present invention. It is appreciated that the apparatus of FIG. 2 is suitable for implementing recursive Equation 3A of Appendix C. One-directional smoother 26 of FIG. 1 may be identical to one-directional smoother 24 of FIG. 2 except that one-directional smoother 26 proceeds in the − direction rather than the + direction such that the pixel preceding pixel i is pixel (i+1) rather than pixel (i−1).

A particular advantage of the apparatus of FIG. 2 is that large signal discontinuities occurring along the dimension of processing are preserved. Disadvantages of the apparatus of FIG. 2 are that high amplitude noise fluctuation and spikes may be preserved and that phase delays may be introduced due to the directional and recursive nature of the apparatus of FIG. 2.

Figure 3:
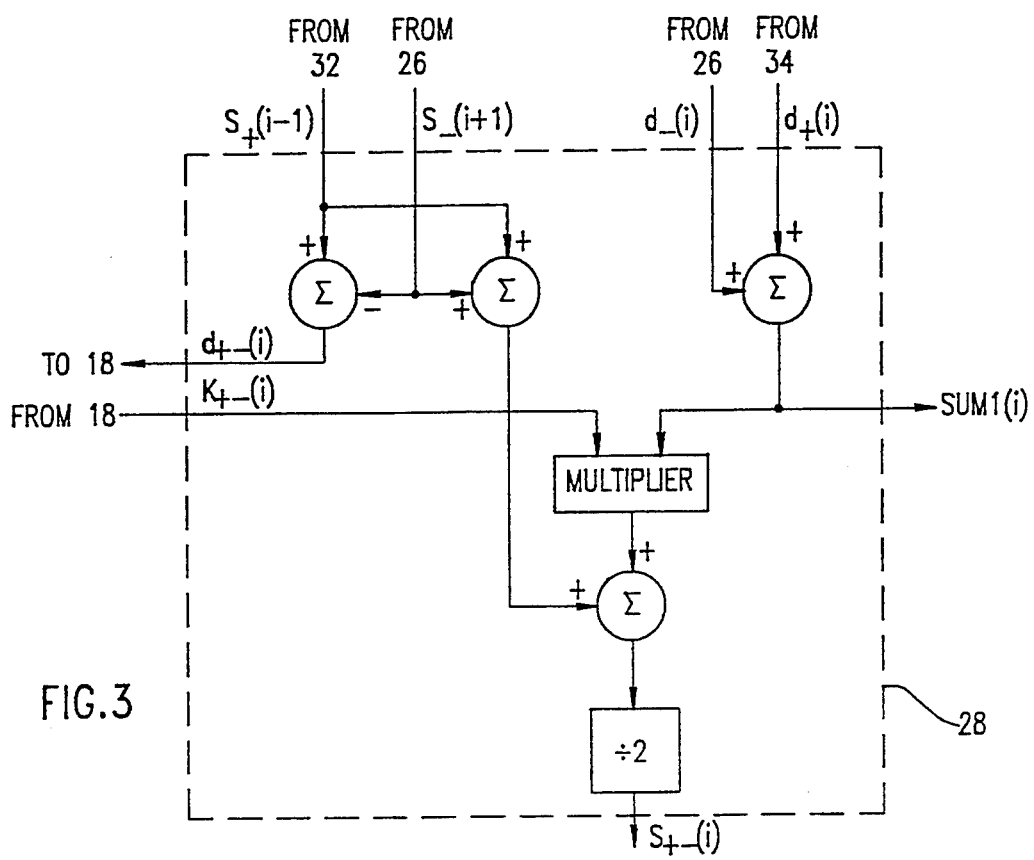
FIG. 3 is a simplified block diagram of two-directional smoothing unit 28 of FIG. 1, constructed and operative in accordance with a first embodiment of the present invention.

Reference is made to FIG. 3 which is a simplified block diagram of two-directional smoother 28 of FIG. 1, constructed and operative in accordance with one embodiment of the present invention. It is appreciated that the apparatus of FIG. 3 is suitable for implementing Equations 6 and 7 of Appendix C. A particular advantage of the apparatus of FIG. 3 is that one-directional smoothed results from neighbors symmetrically disposed on both sides of the current pixel are employed to estimate the strength of the edge signal at the current pixel, and also to effectively smooth noise spikes.

The estimate of edge strength $d_{+-}(i)$ given by equation 6 of Appendix C is useful in edge detection applications, whereby the estimate is used as a confidence measure of edge presence at each point in the image, and where only those image locations having local maxima or relatively high edge strength measures are marked as image edges A more stable edge strength measure $d^E_{+-}(i)$ can be computed using the two-directionally smoothed result, namely $d^E_{+-}(i) = S_{+-}(i-1) - S_{+-}(i+1)$, where $S_{+-}(i-1)$ and $S_{+-}(i+1)$ are computed according to equation 7 in Appendix C.

Figure 4:
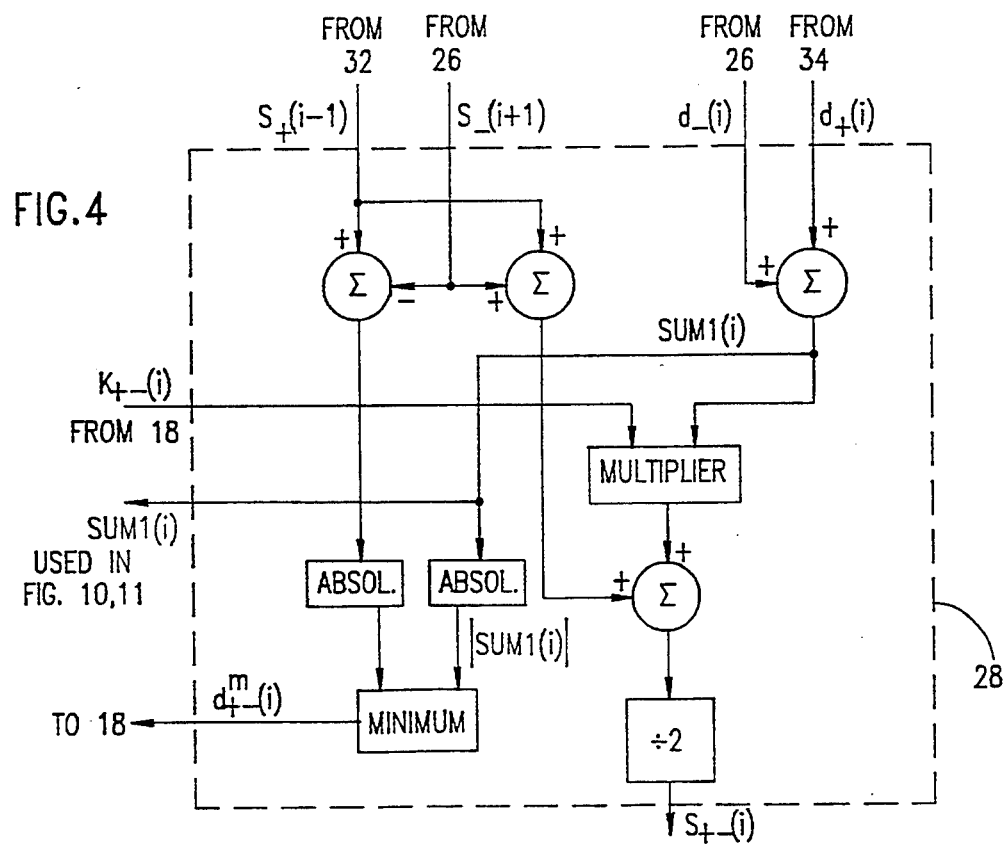
FIG. 4 is a simplified block diagram of smoothing unit 28 of FIG. 1, constructed and operative in accordance with a second embodiment of the present invention.

Reference is made to FIG. 4 which is a simplified block diagram of two-directional smoother 28 of FIG. 1, constructed and operative in accordance with another embodiment of the present invention. The apparatus of FIG. 4 is similar to the apparatus of FIG. 3 except that a different value addresses LUT 18. In FIG. 3, $d_{+-}(i)$ addresses LUT 18 and this address is generated in accordance with Equation 6 of Appendix C. In FIG. 4, $d^m_{+-}(i)$ addresses LUT 18 and this address is generated in accordance with Equation 9 of Appendix C.

A particular advantage of the apparatus of FIG. 4, relative to the apparatus of FIG. 3, is that two separate instances are identified and differently handled. In the first instance, the current input image value, X(i), falls outside of the intensity range delimited by $S_+(i-1)$ and $S_-(i+1)$. In the second instance, the current input image value, X(i), falls between $S_+(i-1)$ and $S_-(i+1)$. In the first instance, the outputs generated by the apparatus of FIGS. 3 and 4 are the same, because both apparatus "hypothesize" the occurrence of a spike coinciding with an image edge. In the second instance, however, the outputs generated by the apparatus of FIGS. 3 and 4 are not the same, because the apparatus of FIG. 4 hypothesizes a surface and consequently, increases the degree of smoothing.

Figure 6:
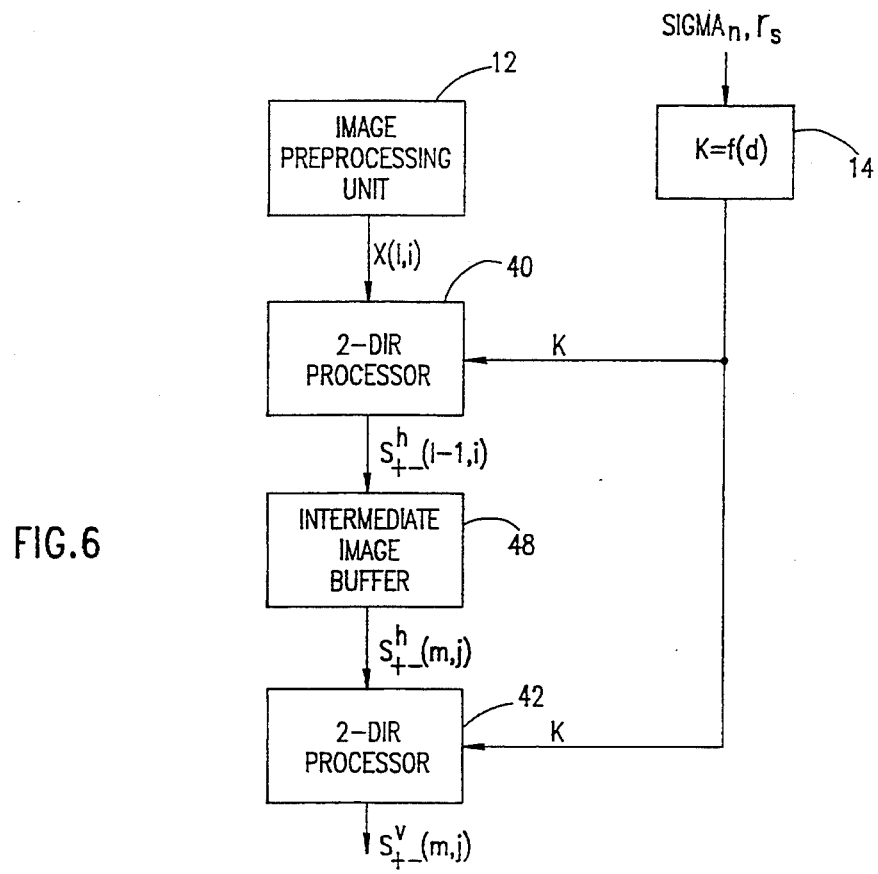
FIG. 6 is a simplified block diagram of image smoothing apparatus constructed and operative in accordance with a preferred embodiment of the present invention which is a second modification of the apparatus of FIG. 1.
Figure 5:
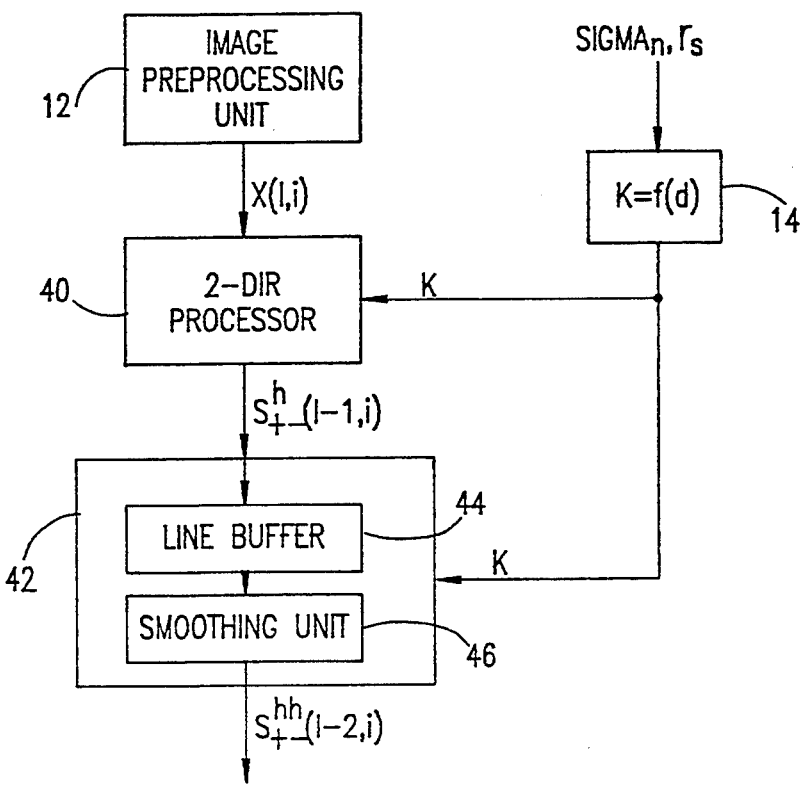
FIG. 5 is a simplified block diagram of image smoothing apparatus constructed and operative in accordance with a preferred embodiment of the present invention which is a first modification of the apparatus of FIG. 1.
Figure 7:
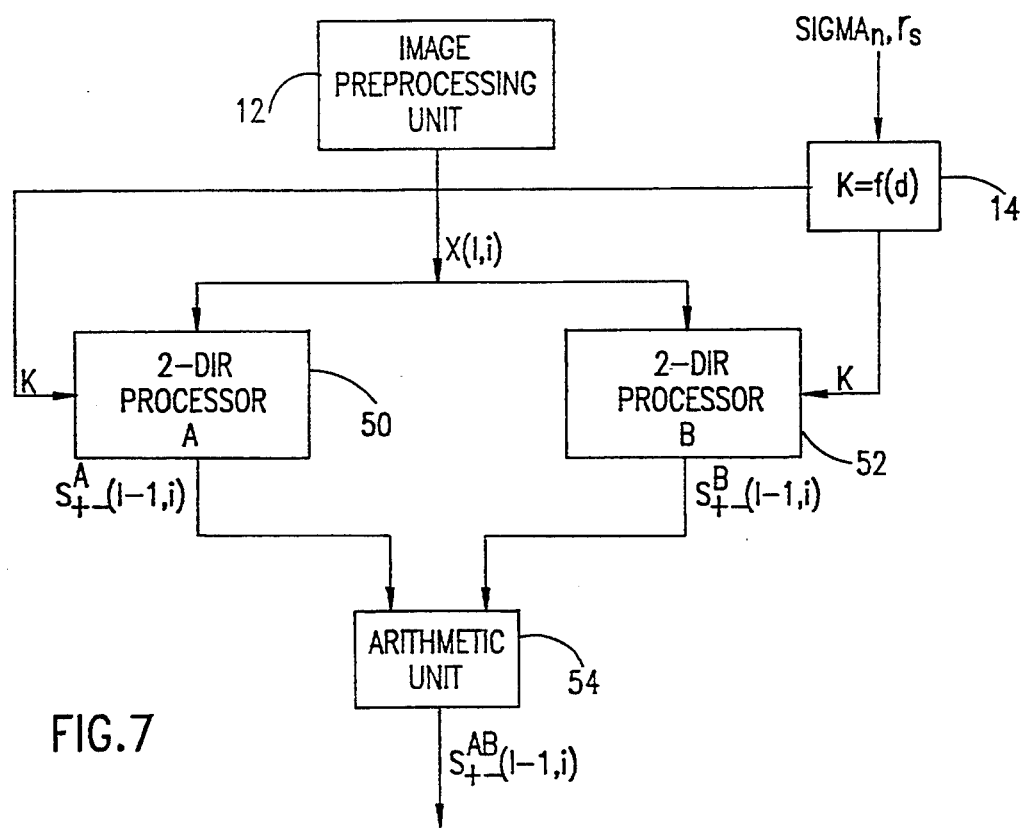
FIG. 7 is a simplified block diagram of image smoothing apparatus constructed and operative in accordance with a preferred embodiment of the present invention which is a third modification of the apparatus of FIG. 1.

In accordance with a preferred embodiment of the present invention, two-directional processor 16 of FIG. 1 may be augmented with one or more additional two-directional processors, each being substantially identical to two-directional processor 16. FIGS. 5, 6 and 7 are simplified block diagrams of smoothing apparatus constructed and operative in accordance with three alternative embodiments of the present invention, respectively, each of which comprise 2 two-directional processors.

Reference is now made specifically to FIG. 5, which is a simplified block diagram of image smoothing apparatus constructed and operative in accordance with a preferred embodiment of the present invention. The apparatus of FIG. 5 is similar to the apparatus of FIG. 1 except that it includes 2 two-directional processors 40 and 42, each of which may be substantially identical to the single two-directional processor 16 of FIG. 1. Two-directional processor 40 receives raw data X(l,i) line by line and generates a two-directional signal estimate, $S^h_{+-}(l-1, i)$, with a one line delay The signal estimates generated by two-directional processor 40 is stored in a line buffer 44 of two-directional processor 42, which may be substantially identical to raw data line buffer 22 of FIG. 1. The data in line buffer 44 is received by a smoothing unit 46 in two-directional processor 42, which comprises units which may be substantially identical to units 18, 24, 26, 28, 32 and 34. A particular advantage of the apparatus of FIG. 5 is that no intermediate memory buffer need be provided between two-directional processors 40 and 42.

Processors 40 and 42 operate along the same dimension, which may be any dimension such as the horizontal dimension. In FIG. 5, the output of two-directional processor 40 is termed $S^h_{+-}$ to indicate that, in the present example, processor 40 proceeds along the horizontal dimension, and the output of two-directional processor 42 is termed $S^{hh}_{+-}$, to indicate that processor 42 provides output which has twice been processed along the same dimension as employed by processor 40.

In FIG. 5 and in subsequent figures, l is an index for image lines (rows, columns, diagonal one-dimensional units, or other types of one-dimensional arrays).

The raw data input to the apparatus of FIG. 5 is designated X(l,i) whereas the output is designated $S^{hh}{}_{+-}(l-2,i)$ to indicate that the apparatus of FIG. 5 operates substantially in real-time, with a delay of only two lines.

Reference is now made to FIG. 6 which illustrates image smoothing apparatus constructed and operative in accordance with a preferred embodiment of the present invention. The apparatus of FIG. 6 is similar to the apparatus of FIG. 5 except that an intermediate image memory buffer 48 is provided between two-directional processors 40 and 42 which stores $S^h{}_{+-}$ values for all image pixels. A particular advantage of the apparatus of FIG. 6 is that, due to the provision of image buffer 48, two-directional processors 40 and 42 need not process along the same dimension of image data.

For example, as shown in FIG. 6, two-directional processor 40 may process the image horizontally, row by row, as indicated by the superscript "h" of the output of processor 40. Two-directional processor 42 may process the image vertically, column by column, as indicated by the superscript "v" of the output of processor 42. The indices of the output of processor 40 are indicated as l and i in FIG. 6, whereas the indices of the input of processor 42 are indicated as m and j, because the two inputs may be read in along different dimensions and therefore are assigned different indices.

Reference is now made to FIG. 7, which is a simplified block diagram of image smoothing apparatus constructed and operative in accordance with a preferred embodiment of the present invention. The apparatus of FIG. 7 may be similar to the apparatus of FIG. 1 except that it includes two two-directional processors 50 and 52, each of which may be substantially identical to two-directional processor 16 of FIG. 1. Unlike in FIGS. 5 and 6, both two-directional processors 50 and 52 in FIG. 7 are arranged in parallel and therefore both operate on raw data X(l,i).

It is appreciated that two-directional processors 50 and 52 of FIG. 7 may process the image along the same dimension but using different input parameters $sigma_n$ and $r_s$. For example, two-directional processor 50 may process the image using K values suitable for excessive smoothing whereas two-directional processor 52 may process the image using K values suitable for providing a choppy image.

The apparatus of FIG. 7 also includes an arithmetic unit 54 which is operative to combine the estimated signals $S^A{}_{+-}(l-1,i)$ and $S^B{}_{+-}(l-1,i)$, generated by two-directional processors 50 and 52 respectively, into an enhanced estimated signal $S^{AB}{}_{+-}(l-1,i)$ For example, the outputs of units 50 and 52 may be suitably weighted and then added by unit 54 in order to obtain an indication of a high frequency enhancement. Alternatively, the combination operation of unit 54 may comprise a weighted subtraction resulting in a bandpass frequency filter.

In FIG. 7, the raw data input to the apparatus of FIG. 7 is designated X(l,i) whereas the output is designated $S^{AB}{}_{+-}(l-1,i)$ to indicate that the apparatus of FIG. 7 operates substantially in real-time, with a delay of only one line.

Figure 8:
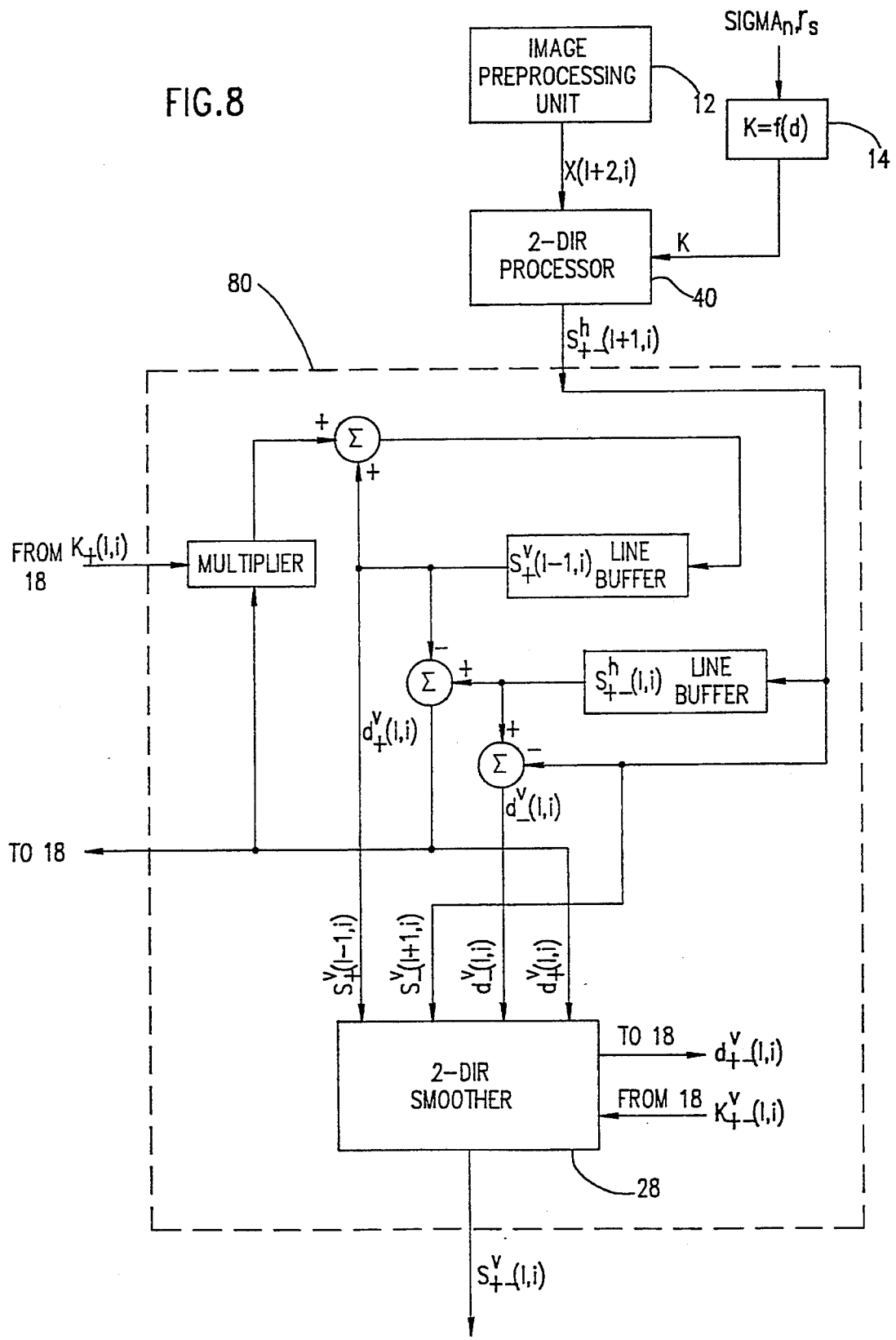
FIG. 8 is a simplified block diagram of image smoothing apparatus constructed and operative in accordance with a preferred embodiment of the present invention which is a fourth modification of the apparatus of FIG. 1.

Reference is now made to FIG. 8 which is a simplified block diagram of image smoothing apparatus constructed and operative in accordance with another embodiment of the present invention. The apparatus of FIG. 8 is similar to the apparatus of FIG. 6 except that the apparatus of FIG. 8 may operate in real time and in order to allow real time operation, the processing of the second dimension is not two-directional in the same sense as in FIG. 6.

As shown, two-directional processor 42 of FIG. 6 is replaced by a "pseudo two-directional smoother" 80. Pseudo two-directional smoother 80 receives $S^h{}_{+-}(l+1,i)$ output values from two-directional processor 40. These values are two-directional, as indicated by the subscript "$+-$", and were processed along a first dimension such as the horizontal dimension, as indicated by the superscript h. It is appreciated that the first dimension need not be the horizontal dimension and in fact may be the vertical dimension or a diagonal dimension oriented at some degree to the horizontal such as but not limited to 45 degrees, or a time dimension. More generally, in all the embodiments illustrated herein, identification of a particular dimension with a particular orientation is not intended to be limiting.

Pseudo two-directional smoother 80 smoothes the output values of two-directional smoother 40 along a second dimension in accordance with Equations 10–15 of Appendix C. Two-dimensional smoother 80 is termed herein "pseudo two-directional" because of the difference between the first direction or top-to-bottom recursive estimation employed by smoother 80, defined by equation 10, and the second direction or bottom-to-top recursive estimation employed by smoother 80, as defined by equation 12. The top-to-bottom estimation of equation 10 employs the second dimensional one-directional estimation of the previous row (one above the current row).

In Equation 10, $K^v{}_+(l-1,i)$ is the steady state estimation gain parameter as defined in Equation 4 of Appendix C for given $r_s$ and snr for: $snr=(d^v{}_+(l-1,i)/sigma_n)^2$ and $d^v{}_+(l-1,i)$ as defined in Equation 11 of Appendix C In contrast, the bottom-to-top estimation of equation 12 does not employ a second dimensional one-directional estimation of the previous row (one below the current row) since this procedure would necessitate storing of substantially the entire image and would introduce considerable delay. Instead, the bottom-to-top second dimensional estimation of equation 12 is based upon the first dimensional two-directional or horizontally smoothed estimation of the row below the current row. In other words, the second directional estimate for a current row is based only upon a single row preceding the current row rather than being based upon all rows preceding the current row. The advantage of using Equation 12 is that the delay introduced is only a one line delay.

Figure 9:
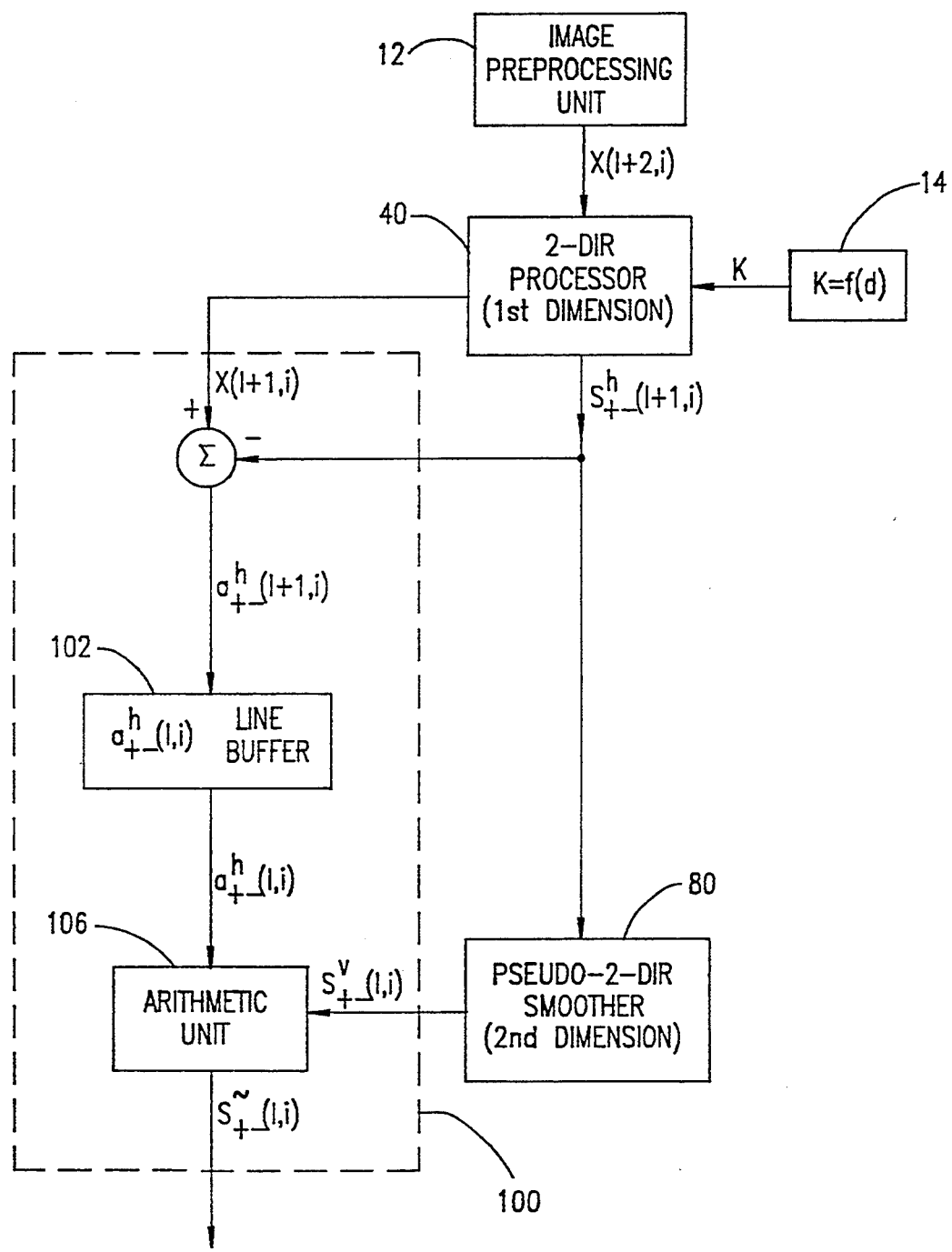
FIG. 9 is a simplified block diagram of image smoothing apparatus constructed and operative in accordance with a preferred embodiment of the present invention which is a fifth modification of the apparatus of FIG. 1.

Reference is now made to FIG. 9 which is a simplified block diagram of image smoothing apparatus constructed and operative in accordance with another embodiment of the present invention which is particularly useful in applications in which it is desired to preserve high frequency detail along a first dimension such as a horizontal dimension and to prevent the high frequency detail from being smoothed in the course of a second dimensional smoothing process such as a smoothing process along a vertical dimension.

The apparatus of FIG. 9 includes units 12, 14, 40 and 80 of FIG. 8. In addition, the apparatus of FIG. 9 includes a high frequency detail signal preserving unit 100. High frequency detail preserving unit 100 receives the signal outputs $S^h_{+-}(l+1,i)$ of two-directional processor 40 and subtracts it from the corresponding original input image values $X(l+1,i)$ in order to obtain values $a^h_{+-}(l+1,i)$ for the horizontal high frequency fluctuations. These fluctuations, in certain applications, are not considered undesired noise but rather indicate high frequency detail along the horizontal or first dimension which should be preserved. A mathematical definition of the $a^h_{+-}(l,i)$ values is provided in Equation 16 of Appendix C.

As shown, the high frequency detail values, $a^h_{+-}(l,i)$, are preserved by storing in a line buffer 102 and do not enter the second dimensional smoothing process carried out by pseudo two-directional smoother 80. An arithmetic unit 106 is provided which combines the high frequency detail values of the first dimension with the two-dimensionally smoothed values of smoother 80. A preferred equation according to which arithmetic unit 106 may be implemented is Equation 17 of Appendix C.

In equation 17, $g(l,i)$ is a high frequency gain factor which may be a constant or, alternatively, may vary over individual pixels g determines the weight assigned to the $a^h_{+-}(l,i)$ values, relative to the two-dimensionally smoothed output values of unit 80. If g is too large, the high frequency detail will appear over-emphasized in the output image, relative to the vertical smoothed information. If g is too small, the high frequency detail will appear to be insufficiently emphasized. Therefore, g may be initially set to a predetermined value such as 1 and may subsequently be changed to a different constant value which may be selected by visual inspection of the output image.

Alternatively, g may be computed as a function of individual pixels using a suitable method such as Wiener filters. Wiener filters are described in Document 1 of Appendix A.

The apparatus of FIGS. 8 and 9 are useful in a wide variety of applications. Two sample applications are described herein which are exemplary of possible applications.

EXAMPLE 1

Linear scanning detectors, such as CCD image scanners have response non-uniformities. Often, the detectors are calibrated and a large portion of the non-uniformities are corrected by appropriate circuitry. However, such corrective measures are limited in accuracy, and residual non-uniformities on the order of 1% to 5% usually remain in the image. Such non-uniformities are perceived as disturbing intensity differences or stripes between adjoining lines along the image scanning dimension.

In accordance with the present invention, such an image may be scanned in a dimension such as the horizontal dimension and intermediately stored in preprocessing unit 12. In the embodiment of FIG. 9, the stored image is first smoothed two-directionally along the horizontal dimension. The high frequency detail signal $a^h_{+-}(l,i)$ is computed by differencing the incoming signal from the smoothed result and is stored in line buffer unit 102. The high frequency signal $a^h_{+-}(l,i)$ is uncorrupted by overshoots and ripples which usually occur in linear filtering since the low pass filter used is an edge preserving two-directional smoother.

The two-directional horizontally smoothed signal is then vertically smoothed by unit 80 and the result $S^v_{+-}(l,i)$ is added to the high frequency preserved signal $a^h_{+-}(l,i)$ by arithmetic unit 106. In this example, the noise to be effectively reduced is mainly in the vertical direction due to line to line non-uniformities of scanning detector elements. The vertical non-uniformities appear as spikes as the apparatus of FIG. 9 proceeds along the vertical dimension of processing and consequently are significantly reduced.

EXAMPLE 2

A known problem is analog recording noise which appears in pre-recorded video images as horizontal stripes and streaks which are normally perceived as being colored. The streaks appear due to the PAL and NTSC video standards and prerecorded playback limitations. The streaking effects are often perceived as stripes due to brightness and color differences between adjacent video lines in various locations along the video lines, and detract from the quality of video and still video imagery.

The edge preserving two-directional smoother unit 40 of FIG. 9 may operate as a high frequency extractor to line buffer 102. Unit 40 also provides an edge-preserved low frequency horizontal signal comprising all vertical non-uniformities which are to be reduced by pseudo two-directional smoother unit 80. If the image is a color image, such as an RGB image, the above described process may be applied to each of the three color images separately to achieve the final RGB image result.

Figure 10:
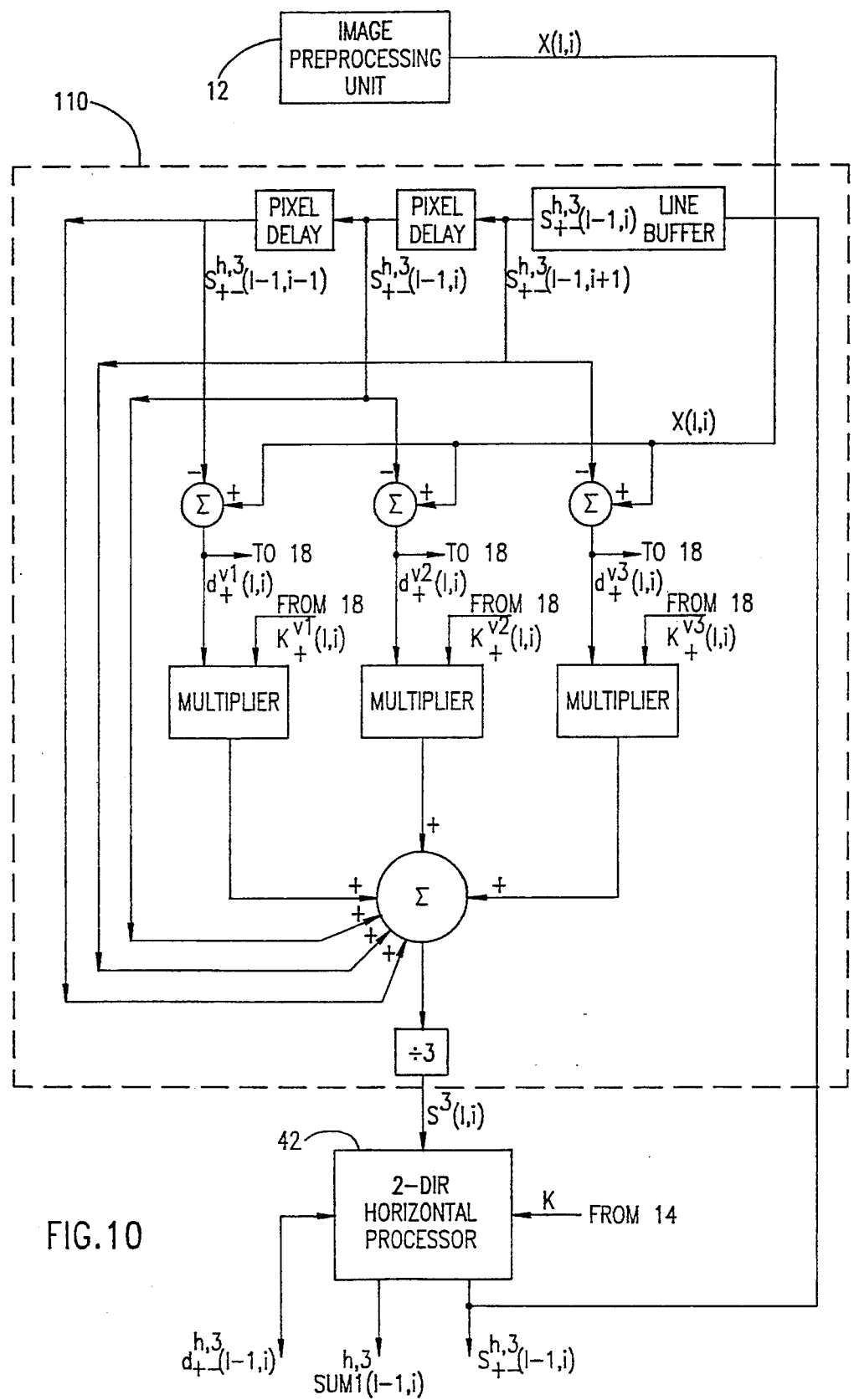
FIG. 10 is a simplified block diagram of image smoothing apparatus constructed and operative in accordance with a preferred embodiment of the present invention which is a sixth modification of the apparatus of FIG. 1.

Reference is now made to FIG. 10 which is a simplified block diagram of image smoothing apparatus constructed and operative in accordance with a further preferred embodiment of the present invention. The apparatus of FIG. 10 is similar to the apparatus of FIG. 5 in which one two-directional processor 42 processes the output of another two-directional processor 40 except that two-directional processor 40 is replaced by a three-dimensional processor 110.

Three-dimensional processor 110 provides $S^3(l,i)$ output for a current line to two-directional processor 42, which may operate in a suitable dimension such as the horizontal. The $S^3(l,i)$ output for a current line $l$ which is generated by three-dimensional processor 110 is a function of $S^{h,3}_{+-}(l-1,i)$ output, for at least one pixel of a previous line, which is provided by two-directional processor 42. Preferably, the S output provided to processor 110 by processor 42 pertains to the vertical neighbor and the two diagonal neighbors of the current pixel, all three of which are located in the previous row.

In the above example, processor 110 is three-dimensional, the three dimensions being the vertical and both 45 degree diagonals. Alternatively, processor 110 may be one- or two-dimensional. The processing carried out by processor 110 along each of the dimensions is one-directional, such as top-to-bottom in the present example.

A particular advantage of the above-described embodiment is that the reliability of the pre-estimated value of the estimated signal is enhanced by using previous estimates of neighbors of a current pixel as well as input regarding the current pixel.

Suitable equations for implementing units 110 and 42 of FIG. 10 are Equations 18–22 of Appendix C.

Preferably, the output of unit 42 in FIG. 10 includes two values, $Sum1^{h,3}(l-1,i)$ and $d^{h,3}_{+-}(l-1,i)$ as defined above with reference to FIG. 1. These values are useful in certain applications, as explained below with reference to FIG. 11.

Figure 11:
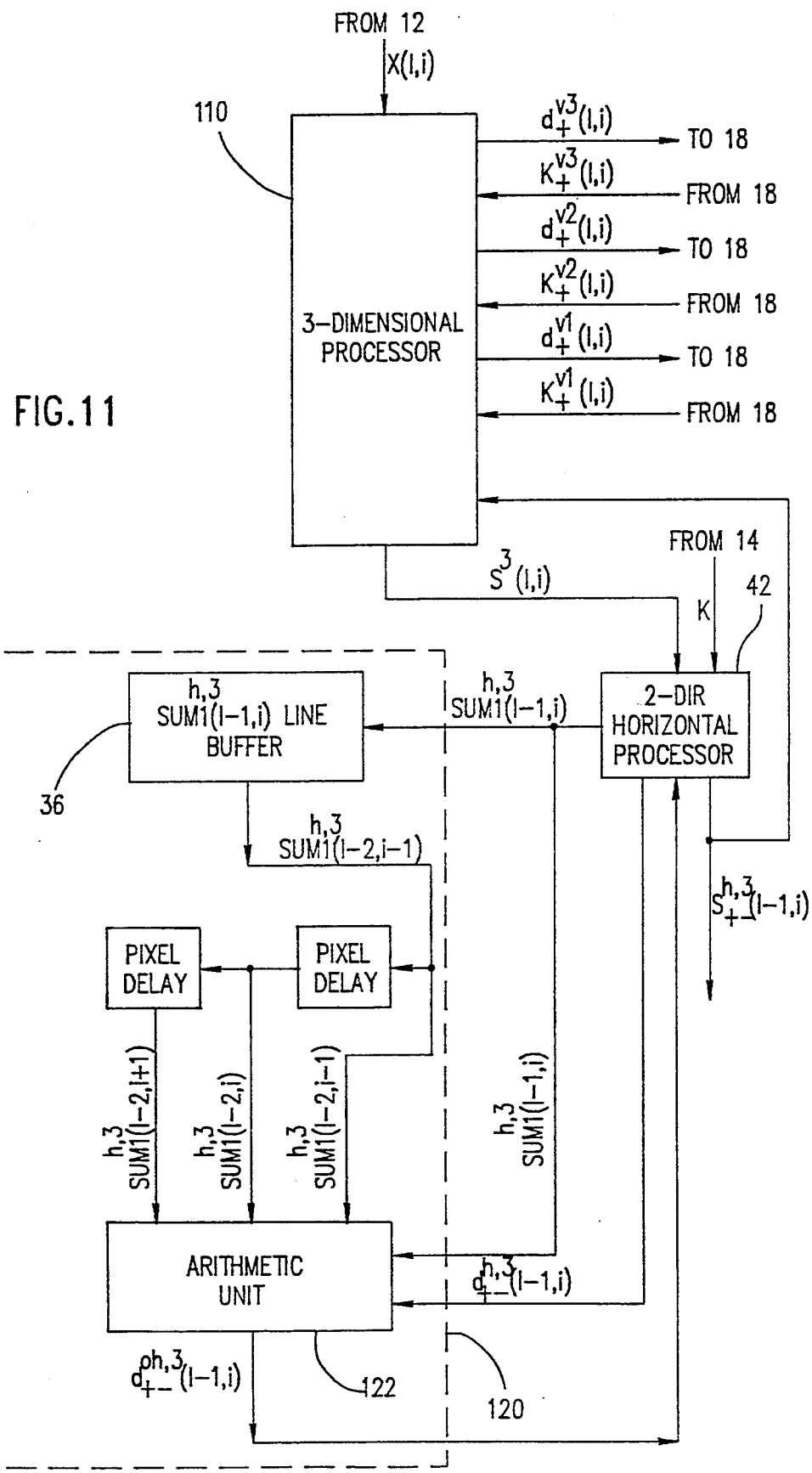
FIG. 11 is a simplified block diagram of image smoothing apparatus constructed and operative in accordance with a preferred embodiment of the present invention which is a seventh modification of the apparatus of FIG. 1.

Reference is now made to FIG. 11 which is a simplified block diagram of image smoothing apparatus constructed and operative in accordance with another embodiment of the present invention which is particularly suitable for applications in which it is desired to preserve thin lines, such as lines whose width is only one pixel, rather than treating the thin lines as noise and smoothing them out.

The apparatus of FIG. 11 is similar to the apparatus of FIG. 10 except that a thin line preserving unit 120 is provided which interfaces with two-directional unit 42. Thin line preserving unit 120 includes an arithmetic unit 122 which receives at least one $Sum1^{h,3}_{+-}$ value of the current line, from unit 42. Preferably arithmetic unit 122 receives three $Sum1^{h,3}_{+-}$ values from the previous line for each current pixel, corresponding to the vertical neighbor and two diagonal neighbors of the current pixel in the previous line. Arithmetic unit 122 provides an address for LUT 18 in unit 42.

The $Sum1^{h,3}_{+-}$ input of arithmetic unit 122, as defined with reference to Equation 23 of Appendix C, is the sum of the two one-directional differences for a particular pixel and therefore is an indication of the presence of a high frequency detail signal in that pixel. A logical equation suitable for implementing arithmetic unit 122 of FIG. 11 is Equation 23 of Appendix C. Equation 23 is operative to generate an output suitable for addressing LUT 18 by incrementing the LUT address $d_{+-}$ if a thin line is found to extend from a current pixel i in row $1-1$ to at least one of pixels $i-1$, i and $i+1$ in row $1-2$. The LUT address is incremented when a thin line is encountered because increasing the value of a LUT address has the effect of decreasing the amount of smoothing and a low level of smoothing is desirable when a thin line is encountered.

Figure 12:
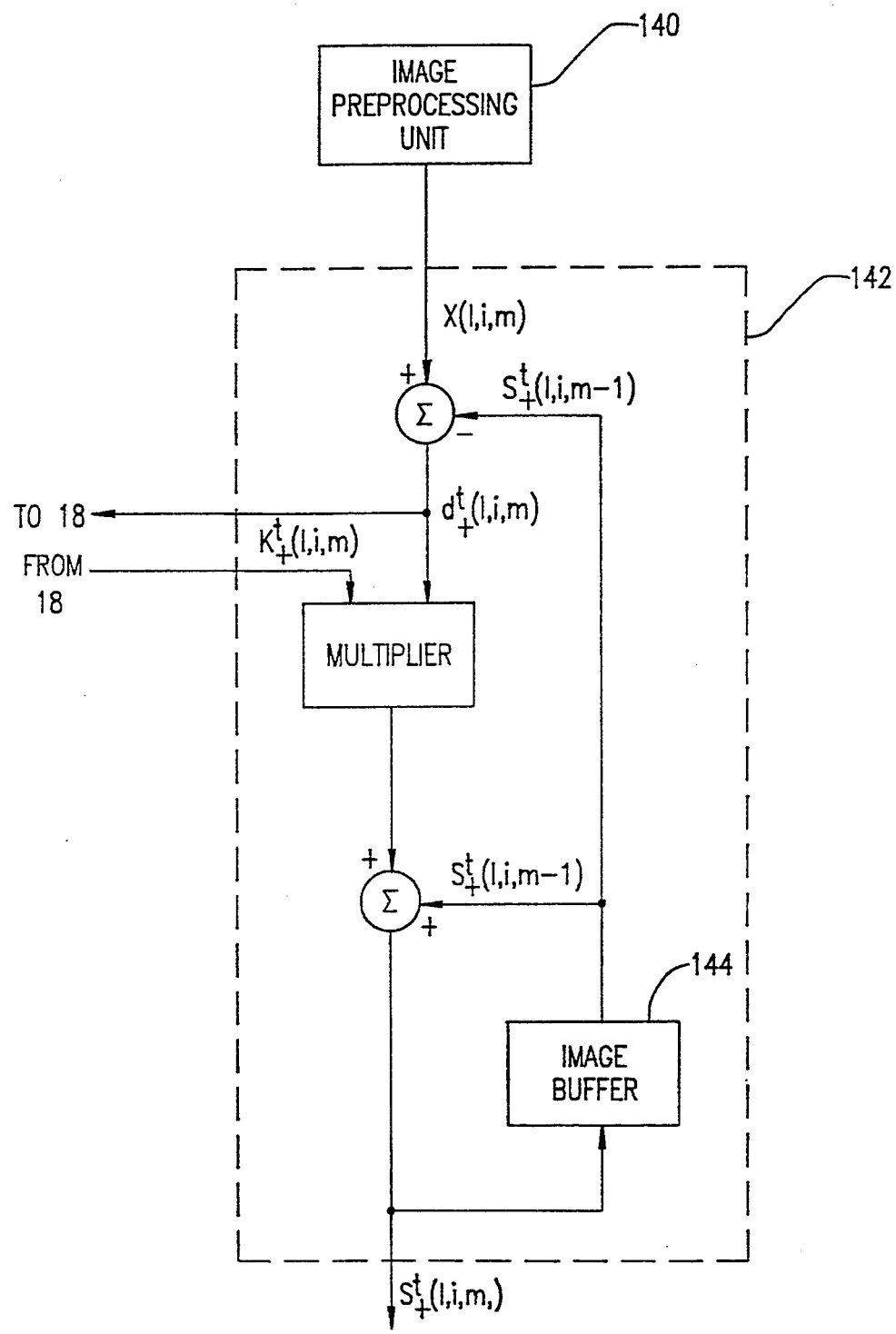
FIG. 12 is a simplified block diagram of smoothing apparatus for smoothing a sequence of images.

Reference is now made to FIG. 12 which is a simplified block diagram of image smoothing apparatus constructed and operative in accordance with a further embodiment of the present invention. The apparatus of FIG. 12 includes an image preprocessing unit 140 which may be identical to image preprocessing unit 12 of FIG. 1. The preprocessed output of preprocessor 140 is provided to a one-directional time domain smoothing unit 142. Unit 142 computes a one-directional time domain estimate $d^t_+(l,i,m)$ of the difference between the raw value of a pixel $(l,i)$ in image m and between a temporally smoothed value of the corresponding pixel in image $m-1$. The pixels of previously smoothed image $m-1$ are stored in a suitable memory unit such as image buffer 144.

The difference estimate $d^t_+(l,i,m)$ is used to address LUT 18 which provides a value $K^t_+(l,i\ m)$ which is employed as a weight as defined in Equation 24 of Appendix C.

Figure 13:
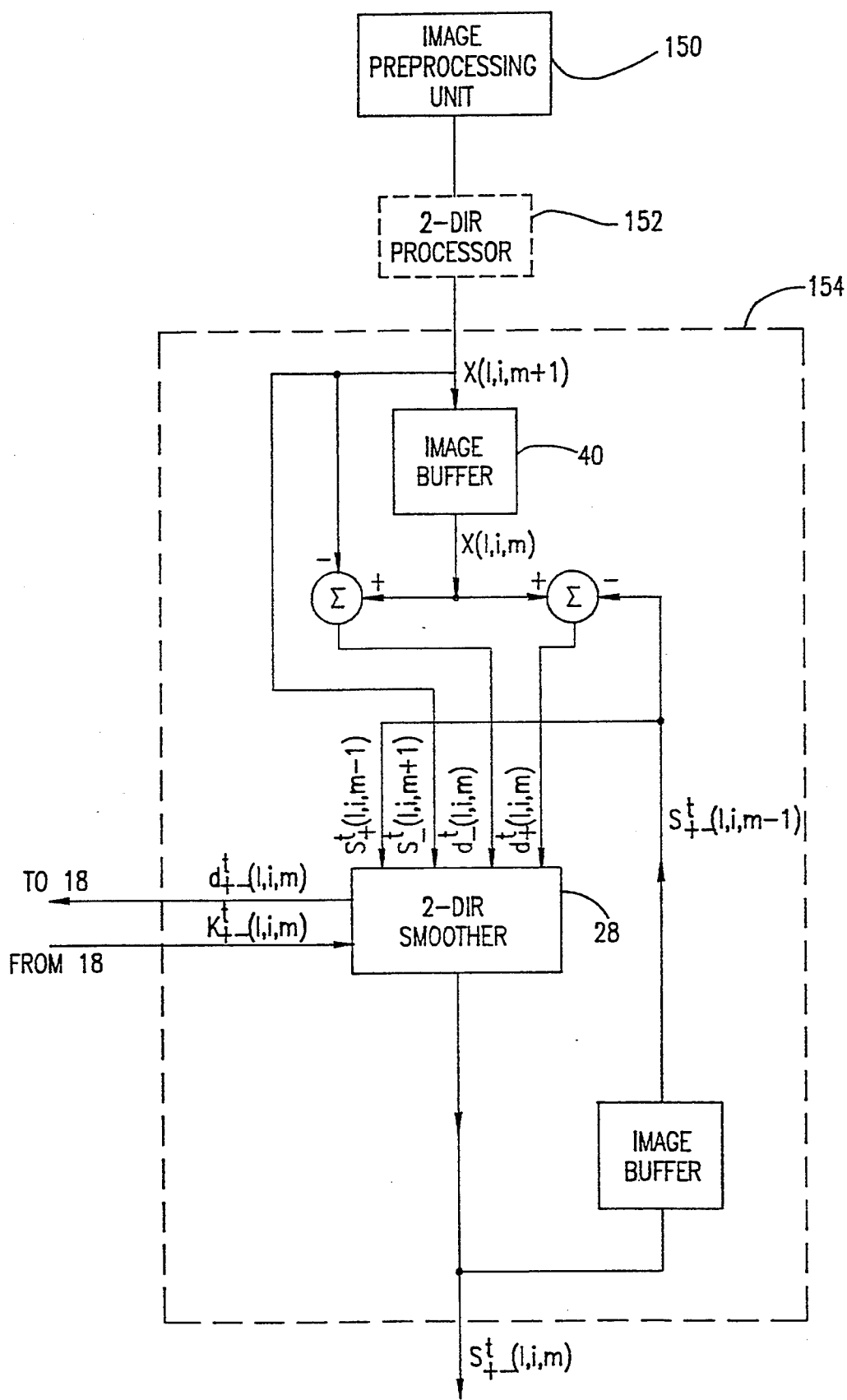
FIG. 13 is a simplified block diagram of image smoothing apparatus constructed and operative in accordance with a preferred embodiment of the present invention which is a modification of the apparatus of FIG. 12.

Reference is now made to FIG. 13 which is a simplified block diagram of two-directional time domain image smoothing apparatus for smoothing a sequence of images which is constructed and operative in accordance with a further embodiment of the present invention. The apparatus of FIG. 13 includes a preprocessing unit 150 which may be identical to preprocessing unit 12 of FIG. 1.

Preferably, a one-dimensional two-directional processor 152 receives the sequence of preprocessed images from preprocessing unit 150 and performs a spatial smoothing operation along lines of each image, which lines may comprise rows of each image.

The preprocessed spatially smoothed output of 2-directional processor 152 or alternatively the preprocessed output of preprocessor 150 is received by a "pseudo-two directional" time domain smoothing unit 154.

Preferred equations for implementing time domain smoothing unit 154 are Equations 25–30 of Appendix C. Equations 25–30 assume that the input of time domain smoothing unit 154 arrives directly from preprocessor 150. If a unit 152 is provided and the input of unit 154 arrives from unit 152 then the value $x(l,i,m+1)$ is replaced by $S^h_{+-}(l,i,m+1)$.

Time domain smoothing unit 154 computes an estimated signal value $S^t_{+-}(l,i,m)$ for pixel $(l,i)$ of current image m using the estimated signal value $S^t_{+-}(l,i,m-1)$ for pixel $(l,i)$ of preceding image $m-1$ and a raw value or two-directionally spatially smoothed value for pixel $(l,i)$ of the current image m and for the same pixel of proceeding image $m+1$. Unit 154 is termed herein "pseudo 2-directional" because the estimated signal values for image m are recursive functions of:

(a) the estimated signal values for preceding images, given by $S^t_+(l,i,m-1)$ in accordance with Equation 25 of Appendix C, and corresponding to a first direction of processing; and of (b) a less high-quality indication of the signal values for the proceeding image, given by $S^t_-(l,i,m+1)$ in accordance with Equation 27 of Appendix C, and corresponding to a second "pseudo-direction" of processing.

Conventional approaches to temporal noise reduction such as running average algorithms, discussed in Documents 4 and 6 of Appendix A have the disadvantage of blurring images of moving objects and of non-stationary images. The embodiments of FIGS. 12 and 13 are operative to adapt the integration parameter on a pixel-by-pixel basis. Adaptation is in accordance with the measured difference between the current pixel and the smoothed result of the corresponding pixel in the previous image, as may be appreciated with reference to Equations 24–30 of Appendix C.

It is believed that the applicability of the apparatus and methods shown and described herein are not restricted to smoothing of monochromatic and color visual images and may also be useful in smoothing other types of data such as but not limited to audio signals and ultrasound signals. Also, the particular delay structure shown and described herein are merely exemplary of possible delay structures. Any suitable conventional delay structure may be employed to implement each of the embodiments shown and described herein.

It is appreciated that the various features of the various embodiments shown and described herein may be combined in any suitable manner so as to provide variations on the embodiments particularly shown and described herein. For example, it is appreciated that the two-directional edge strength measures $d_{+-}(i)$ and $d^E_{+-}(i)$ can be extended and computed in a similar manner in additional spatial and temporal dimensions resulting in more reliable edge strength measures and edge detection.

It will be appreciated by persons skilled in the art that the present invention is not limited to what has been particularly shown and described hereinabove. Rather, the scope of the present invention is defined only by the claims that follow.

APPENDIX A

The disclosures of all the documents listed hereinbelow are hereby incorporated by reference.

Appendix A:
References:
1. Mahesh, B., Song, W. J. and Pearlman, W. A. (1990) "Adaptive Estimators for Filtering Noisy Images", OPTICAL ENGINEERING, Vol. 29 No. 5, p. 488-494.
2. Guissin, R., (1991) "Adaptive Noise Reduction Using An Edge-Preserving Recursive Smoother", Ninth Kobe International Symposium on Electronics and Information Sciences, Kobe, Japan, June 18.
3. Chin R. T. and Yeh C. L., (1983) "Quantitative Evaluation of Some Edge-Preserving Noise-Smoothing Techniques", COMPUTER VISION, GRAPHICS & IMAGE PROCESSING 23, p. 67-91.
4. Gelb, A. edt. (1974) APPLIED OPTIMAL ESTIMATION, Technical Staff, The Analytic Sciences Corporation, M.I.T. Press, Cambridge, Mass.
5. Guissin, R., (1988) "Adaptive Dynamic Range Compression for Flir Imagery", SPIE Vol. 1038, Sixth Meeting in Israel on Optical Engineering, p. 299-306.
6. Rabiner, L. R. & Gold. B., (1975) THEORY & APPLICATION OF DIGITAL SIGNAL PROCESSING, Prentice-Hall Inc. Englewood Cliffs, N.J., p. 205-209.
7. Pal. S. K. and Majumder, D. K. D, (1986) FUZZY MATHEMATICAL APPROACH TO PATTERN RECOGNITION, A Halsted Press Book, John Wiley & Sons, New York.
8. Papoulis, A. (1965) "PROBABILITY, RANDOM VARIABLES AND STOCHASTIC PROCESSES, Mc-Graw-Hill, Kogakusha Ltd.

APPENDIX B

Edge-Preserving, Image Noise Reduction Method

1. ABSTRACT

A computational method for image noise reduction using an edge-preserving, recursive, spatial smoothing scheme. The approach utilizes the discrete Kalman filter formulation, and automatically classifies on a pixel-by-pixel basis, the occurrence of an (a) edge signal, (b) narrow line or contour signal, or (c) smooth brightness signal. Based on this classification, the gain factor of the Kalman smoother is updated, resulting in a dramatic reduction in image noise in smooth brightness regions of the image, while at the same time preserving important high frequency content in the image, such as edges, lines and contours. The scheme combines bi-directional and two-dimensional processing, and a simply computed, local (pixel-by-pixel) measure which classifies the local signal behavior according to the above three signal modes, and selects the most appropriate Kalman gain factor. The gain factor is computed recursively a-priori for the entire possible range of image signal modulations, and stored in a look-up-table for easy and quick access. The adaptive, smoothing operator is also designed as an unbiased estimator, hence avoiding response drifts. The spatial smoothing algorithm can easily be repeated iteratively in the presence of excessive noise, and can be implemented in various real-time imaging and scanning applications using an efficient pipeline architecture. In addition, it may be extended in the time domain as a spatio-temporal smoothing scheme, by incorporating corresponding smoothed pixels from previous smoothed images in the estimation process of the current image pixels using a similar computational model as in the spatial scheme.

2. BACKGROUND OF THE INVENTION

This invention relates to the problem of digital image restoration in the face of additive, randomly distributed noise. More specifically, the objective is to optimally estimate the original image signal by smoothing the incoming, noise corrupted image. The general idea is to smooth gradually changing brightness surfaces and at the same time preserve more abrupt brightness changes such as edges, lines and contours. The residual distortions in the smoothed image as compared to the original noise free image are defined as errors in the estimation process.

The problem of image restoration in the face of noise applies to a wide range of electrooptical imaging and scanning applications, and electronic TV and graphic displays. Industrial, commercial (hand-held) and broadcast quality imaging cameras such as CCD-TV cameras often face low light level situations, in which cases the resulting image quality is reduced due to the low signal to noise ratios. In such cases, video signals are usually amplified to the point where electronic noise and CCD detector non-uniformities are clearly visible in the image. This problem arises also in still video cameras, where a single snapshot is taken per scene, in which cases the combined effects of fixed-pattern and random noise become more clearly visible and disturbing to the human observer. Low light level imaging with a high degree of noise often occurs in surveillance applications using combined IV image intensifiers. Image noise also appears in medical imaging applications, for example ultrasound, and in photon-counting imaging systems. Image scanning applications often also require means of noise reduction, depending on the lighting conditions, and the scanned data (imagery and text on paper or film). CCD scanner detectors also suffer from fixed-pattern noise caused by nonuniformities in the detector element responsivities, which can be corrected using digital image processing restoration schemes.

Existing digital processing restoration schemes can generally be categorized into two classes: (a) Spatial soothing operators which utilize spatial image information only, and (b) temporal integration operators which integrate sequences of digitized images sequentially with a finite response time hence extending the effective exposure duration and improving the signal to noise. Spatial operators usually result in residual distortions such as high frequency content (edges, lines and contours) blurring as compared to the actual image, and are generally unacceptable subjectively. However, in cases of TV imaging, for example, they may avoid image blurring during motion since they are continuously updated. Temporal image integrators provide sufficient improvement in image quality in applications where no motion takes place. Otherwise, they cause severe blurring to the image, and are therefore found unsuited, The noise reduction method provided by the current invention combines the advantages of spatial smoothing and temporal integration noise reduction approaches, in that is automatically and efficiently selects on a pixel-by-pixel basis, the most appropriate signal model being either (a) an edge model, (b) a line or contour model, or (c) a smooth surface model. The spatial smoothing operator is a recursive, bi-directional and two-dimensional operator. The operator utilizes minimum recursive computations with a reasonable requirement of video line memories in a pipeline architecture, which makes it particularly suitable for real-time applications. Iterative spatial smoothing can also be achieved by repeating the operation using identical two-dimensional computing elements in an efficient cascaded form. The spatial smoothing approach results in higher performance compared to existing estimation filters such as Wiener filters, and edge-preserving smoothing operators such as median filters. Moreover, it can easily be adapted to a wide range of application imagery, by changing few control parameters and stored Kalman filter gain factors. In a similar manner, the spatial smoothing scheme can be extended into the time domain using image sequences, for example TV images, by incorporating corresponding pixels from previously smoothed images for the estimation of the currently processed pixel. The resulting spatio-temporal operator is then a three-dimensional scheme, and is the ultimate solution in the recursive processing domain.

3. SUMMARY OF THE INVENTION

The present invention incorporates, in a very simple and direct approach, the discrete Kalman formulation for the development of an adaptive, edge-preserving image noise reduction algorithm. Given the additive noise level in the image, a bi-directional recursive computation provides a simple and accurate estimate of a local image statistic, namely the local signal to noise ratio. This statistic is computed selectively depending on whether the current pixel is classified as (a) an edge pixel, (b) a line or contour pixel, or (c) a smooth brightness surface pixel, and is then used to select the appropriate Kalman gain factor. Steady state Kalman gain factors for the entire range of expected signal to noise ratios can be computed recursively and stored in memory and look up tables for direct access and use. The incorporation of recursive two-dimensional computations using the previously soothed line (just above the current line), provides an efficient input for overcoming erroneous hypothesis between (a) edge occurences, and (b) line or contour occurrences. The incorporation of recursive three-dimensional computations using previously smoothed images (for example in video sequences), combines the advantages of integration in occasions where no motion occurs, with purely spatial smoothing in those image regions where motion would have otherwise introduced blurred results. The invented method applies directly to a wide range of image processing applications, including image enhancement, coding and compression, interpolation and electronic zoom applications.

4. BRIEF DESCRIPTION OF THE DRAWINGS

A more complete understanding of the invention and the features, objects, and advantages thereof may be obtained from a consideration of the following detailed description in connection with the appended claims and the attached drawing in which FIG. 1 is a concept block diagram illustrating the functional arrangement and process flow of computations in which the edge-preserving image noise reduction method of the invention can be carried out;

FIG. 2 is an illustration of the basic one-dimensional estimation computation mechanism and data flow in conjunction with the invention;

FIG. 3 is an illustration of the bi-directional data flow, logic and corresponding computations in conjunction with the invention;

FIG. 4 is an illustration of the combined bi-directional and two-dimensional data flow and corresponding computations in conjunction with the invention;

FIG. 5 is an illustration of the combined spatio-temporal, three-dimensional data flow and corresponding computations in conjunction with the invention.

5. DESCRIPTION OF THE EMBODIMENT

FIG. 1 illustrates the block diagram of the functional organization and process flow of data and computations of the edge-preserving noise reduction method. Analog video or scanner image signals are first digitized by Unit 10, which may also include any automatic means of gain and level control for optimized digitization of the incoming signal. Unit 11 comprises the entire noise reduction computational spatial algorithm, and as illustrated in FIG. 1, may be cascaded in a pipeline fashion by identical operators, hence providing iterative computations without reducing the data flow throughput and scanning rates. Unit 11 is composed of several subunits numbered 12 thru 16. Subunit 12 consists of the basic, one-dimensional Kalman estimator which is based on a piecewise-smooth, wide sense stationary Markov image model described blow. Subunits 13 in FIG. 1 are intermediate storage, delay line FIFOs (First In—First Out) which provide the necessary storage and delay elements of the incoming signal and intermediate computational results of the noise reduction method. Subunit 14 comprises the bi-directional mechanism which automatically selects (according to a set of logical rules) the appropriate signal mode of the current pixel, namely (a) edge signal, (b) narrow line or contour signals, or (c) smooth brightness signals, and computes the smoothed results for both scan directions. Subunit 15 contains a look-up-table of steady state, pre-computed Kalman filter gain factors for the entire range of expected signal to noise estimates and a fixed (assumed and preset) spatial correlation value. Subunit 16 Comprises the two-dimensional smoothing computation which combines the current bi-directional smoothed results with the previously scanned smoothed image line. Subunit 17 comprises the manual or automatic noise level input to the noise reduction scheme in the form of variance estimate of the image noise, which is then used as a scaling factor of the estimated signal variance and used as the input signal to noise measure to the Kalman gain factor look-up-table of subunit 15.

A more detailed illustration of the one-dimensional Kalman filter basic computing element is given in FIG. 2. The noise-free image signal is modeled stochastically as a piecewise stationary process, composed of adjoining regions each of which is modeled as a 1st order (wide-sense) Markov process, with corresponding mean value, variance and correlation coefficient. The image is corrupted by a normally distributed, uncorrelated, additive noise process. The objective is to optimally estimate the original image signal by smoothing the incoming, noise corrupted image. The general idea is to smooth gradually changing brightness signals while at the same time to preserve essential high frequency signal content such as edges, lines and contours. Residual distortions in the smoothed image as compared to the original image signal are defined as the estimation errors.

The minimum mean square error (MMSE) recursive, unbiased estimate of a wide-sense Markov process with a non-zero mean value is given by:

$$s(i) = \rho_s \cdot s(i-1) + (1-\rho_s)\mu_s$$

where:
  s(i) denotes the MMSE recursive estimate,
  s(i−1) denotes the previous Markov process outcome,
  $\rho_s$ denotes the correlation coefficient of the process,
  $\mu_s$ denotes the mean value of the process.

The utility of Markov modeled processes which are also Gaussian distributed, is in that Kalman recursive estimation theory applies directly as a valid solution to the problem in an optimal sense and in closed form. In terms of the well known discrete Kalman filter equations, the image pixel estimate is denoted as the state estimate. The system model is given by the Markov model of the image pixel sequence:

$$s(i) = \rho_s s(i-1) + \psi(i-1);\ \psi \sim N(0, \sigma_s^2(1-\rho_s^2))$$

where the notation $N(\mu, \sigma^2)$ denotes a non-correlated, normally (Gaussian) distributed process. The noise corrupted pixel intensity measurement is denoted by x(i), and the measurement model notation in the present one-dimensional analysis is given by:

$$x(i) = s(i) + v(i);\ v \sim N(0, \sigma_n^2)$$

At each sample point i of the process the state estimate extrapolation denoted by $s_-(i)$ is given by:

$$s_-(i) = \rho_s s_+(i-1) + (1-\rho_s)\mu_s$$

where $s_+(i-1)$ denotes the state estimate update at the previous process sample. The error covariance extrapolation at the sample point i is denoted by $P_-(i)$ and is given by:

$$P_-(i) = \rho_s^2 P_+(i-1) + \sigma_s^2(1-\rho_s^2)$$

where $P_+(i-1)$ denotes the error covariance update at the previous process sample. The state estimate update at pixel i is given by:

$$s_+(i) = s_-(i) + K(i)[x(i) - s_-(i)]$$

where K(i) denotes the Kalman gain factor at pixel i, and is given by:

$$K(i) = \frac{P_-(i)}{P_-(i) + \sigma_n^2} = \frac{\rho_s^2 P_+(i-1) + \sigma_s^2(1-\rho_s^2)}{\rho_s^2 P_+(i-1) + \sigma_s^2(1-\rho_s^2) + \sigma_n^2}$$

The error covariance update is given by:

$$P_+(i) = [1-K(i)]P_-(i) = K(i)\sigma_n^2$$

From the above formulation, the Kalman gain factor K(i) can be expressed recursively in terms of K(i−1):

$$K(i) = \frac{\rho_s^2 K(i-1) + \sigma_s^2(1-\rho_s^2)}{\rho_s^2 K(i-1) + \sigma_s^2(1-\rho_s^2) + \sigma_n^2}$$

and with the signal to noise ratio given by $snr = \sigma_s^2/\sigma_n^2$, the following simple expression for K(i) is obtained:

$$K(i) = \frac{\rho_s^2 K(i-1) + snr(1-\rho_s^2)}{\rho_s^2 K(i-1) + snr(1-\rho_s^2) + 1}$$

In order to compute K(i) at a given point in the estimation process, the local mean, variance and correlation estimates must be computed. Given these statistics, the steady state values for the Kalman gain factor can be computed recursively a-priori as a function of expected snr and $\rho_s$ values, and stored in look-up tables. The recursion is initiated by setting the initial value K(0) to the following expression:

$$K(0) = \frac{snr}{snr + 1}$$

Additional simplifications are introduced into the estimation process. The value for $\rho_s$ is preset to a constant value, and it is assumed that the noise variance $\sigma_n^2$ of the incoming signal is known as is often the case. It therefore remains to estimate the snr locally. The snr should somehow be related to the degree of uncertainty in the local estimate. A heuristic and rough estimate of snr on a pixel-by-pixel basis is suggested by the following difference expression:

$$snr = \frac{(X(i) - s_-(i))^2}{\sigma n^2}$$

More sofisticated snr estimates can be computed using adaptive windows in the neighborhood of the current pixel location. The regional mean value $\mu_s$ is expected to vary between adjoining regions. Repeated computations of the local region mean value is avoided at a marginal error cost, by modifying the state estimate update s(i) expression as follows:

$$s(i) = s(i-1) + K(i)[x(i) - s(i-1)]$$

with the snr of the Kalman gain factor K(i) given by:

$$snr = \frac{(X(i) - s(i-1))^2}{\sigma n^2}$$

This simplifying modification ensures the estimation process does not drift from the regional mean value. The one-dimensional Kalman estimation filter (subunit 12 in FIG. 1) is the basic computing element in the invented method and is illustrated in more detail in FIG. 2.

Two observations should be noted concerning the resulting one-dimensional approximated Kalman estimation procedure above. Firstly, we observe that the adaptive Kalman gain factor agrees with intuition in that it is "proportional" to the degree of uncertainty in the estimate and "inversely proportional" to the measurement noise. Hence when measurement noise is large compared to estimate uncertainty (low snr), small changes in the current estimate should be made. On the other hand, small measurement noise and large uncertainty (high snr) in the state estimate suggests that the current sample measurement contains considerable information. Therefore, the difference between actual and predicted measurement will be used as a basis for strong corrections to the current estimate. The second observation relates to a major drawback of the one-dimensional scheme, where the degree of preserving noise signals in the resulting image increases with amplitude of the noise, i.e. strong noise spikes remain unaltered. This problem is overcome by incorporating a bi-directional processing scheme, where the Kalman gain factor is selected using bi-directional estimates according to a local classification logic of signal behavior between (a) edge signal, (b) line or contour signal, or (c) smooth brightness signal.

As illustrated in FIG. 1, the bi-directional smoothing mechanism (subunit 14) is computed following a one-dimensional smoothing process took place and the temporary storage of the incoming signal and the soothed result in corresponding delay line FIFOs. Recognizing the high sensitivity of the Kalman gain snr measure to image noise, the bi-directional smoothing logic is incorporated utilizing both, left-to-right (i) and right-to-left (i) one-dimensional smoothed results to estimate, per pixel location, a more robust measure for the local, Kalman gain snr (see FIG. 3) Assuming the complete left-to-right (i), one-dimensional smoothed result was previously computed and stored in a FIFO, the bi-directional smoother starts by computing the right-to-left (i) smoothed result at each pixel, by comparing the two absolute differences s1(i) and s2(i) given by:

$$s1 = |\ (i+1) - \ (i)|;\ s2 = |\ (i+1) - \ (i-1)|$$

If s1(i) > s2(i), a smooth brightness signal is identified, and the corresponding snr measure is given $$snr = \frac{s_2^2}{\sigma n^2}$$

The above snr measure is then used to select the Kalman gain factor K(i) and compute the right-to-left (i) smoothed estimate according to the following expression:

$$(i) = \ (i+1) + K(i)[x(i) - \ (i+1)]$$

In addition, the same snr measure is utilized to correct the left-to-right (i) estimate, given by the following expression:

$$(i) = \ (i-1) + K(i)[x(i) - \ (i-1)]$$

Alternatively, if s2(i) > s1(i), an edge signal is hypothesized and the right-to-left smoothed estimator (i) is computed as follows:

$$(i) = \ (i+1) + K(i)[x(i) - \ (i+1)]$$

with the corresponding snr measure given by:

$$snr = \frac{s_1^2}{\sigma n^2}$$

Now using the smoothed right-to-left (i) result for the current pixel, we re-estimate the snr measure for the left-to-right directional smoother (i) according to the following expression:

$$(i) = \ (i-1) + K(i)[x(i) - \ (i-1)]$$

with the corresponding snr measure given by:

$$snr = \frac{|\overleftarrow{s}(i) - \overrightarrow{s}(i-1)|^2}{\sigma n^2}$$

Hence, at each pixel in the bi-directional smoothing operator, right-to-left (i) and left-to-right (i) smoothed directional estimates are computed utilizing the best possible pixel-by-pixel estimate for the Kalman gain factor. The major disadvantage of the bi-directional smoothing operator, is in that it smoothes narrow image lines and contours which often bear subjectively essential image information. We compensate this limitation by incorporating a two-dimensional scheme which utilizes the previous image line soothed pixels in the estimation of the current pixel (see FIG. 4). To each two-dimensionally smoothed pixel in the previous line neighboring the currently processed pixel ($\bar{s}_{l-1}(i-1)$ $\bar{s}_{l-1}(i)$, $\bar{s}_{l-1}(i+1)$), we apply the one-dimensional Kalman smoothing operator, with the corresponding gain factor look-up value given by the difference expression:

$$s_{l,i-1}(i)\ s_{l-1}(i-1) + K(i)\ [X(i) - s_{l-1}(i-1)]_i\ kasnr = \frac{|x(i) - s_{l-1}(i-1)|^2}{\sigma n^2}$$

$$s_{l,i}(i)\ s_{l-1}(i) + K(i)\ [X(i) - s_{l-1}(i)]_i\ kasnr = \frac{|x(i) - s_{l-1}(i)|^2}{\sigma n^2}$$

$$s_{l,i+1}(i)\ s_{l-1}(i+1) + K(i)\ [X(i) - s_{l-1}(i+1)]_i\ kasnr = \frac{|X(i) - s_{l-1}(i+1)|^2}{\sigma n^2}$$

This extension can easily be shown to preserve narrow image lines in the smoothed output image. Hence, we get five intermediate smoothed results: two bi-directional estimates (i), (i)), and three one-dimensional estimates from the previous line ($\bar{s}_{l-1}(i-1)$, $\bar{s}_{l-1}(i)$, $\bar{s}_{l-1}(i+1)$). These five estimates are then averaged with equal weights, and the resulting two-dimensional smoothed pixel estimate is given by:

$$s(i) = 1/5(\ (i) + \ (i) + s_{l,i-1}(i) + s_{l,i}(i) + s_{l,i+1}(i))$$

The above two-dimensional smoothing scheme can easily be iterated using identical computing elements as illustrated in FIG. 1, where the soothed output signal of the first iteration is used as the input to the second iterative computation, etc. This pipeline architecture does not effect the throughput rate of data flow, and also provides a convenient design solution for various degrees of estimation problems which may need different amount of iterative computations. The only necessary control parameter which needs to be changed according to the corresponding iterative scheme is the noise variance estimate of the incoming signal, and is pre-computed from smoothing simulations on smooth and noise brightness signals.

The above two-dimensional smoothing scheme can be extended into the time domain (see FIG. 5), by incorporating neighboring pixels from the previously smoothed images using a similar Kalman estimation formulation, for example in the case of sequences of video images. The three-dimensional scheme provides all the benefits of temporal integration in stationary sequences, and must contend with regions where image motion may effect and degrade the integrated results.

Although the present invention has been described in connection with a particular embodiment thereof, additional embodiments, applications, and modifications,

What is claimed is:

1. An edge-preserving image noise reduction method, which incorporates one-dimensional, bi-directional, two-dimensional and three-dimensional estimation computations.

2. An adaptive and efficient method for locally estimating the Kalman gain factor for the said estimation task, according to a local signal interpretation between (a) edge signals, (b) narrow image lines and contours, and (c) smooth brightness signals, and computes the edge-preserving estimate for each pixel in the image.

3. An efficient iterative estimation arrangement using identical cascaded computational operators by appropriately varying their corresponding control parameters.

4. The estimation method may be applied directly in a wide variety of image processing applications, including image and contrast enhancement applications, edge detection applications, image compression and coding applications, image interpolation and electronic zoom applications.

APPENDIX C

Equation 1A.

$$X(i) = S^*(i) + n(i) \text{ [Appendix A—Reference 2]}$$

where:
$S^*(i)$ = the desired signal as defined in Equation 1B for pixel i; and
$n \sim N(0, sigma_n)$ = zero mean, non-correlated, normally distributed (Gaussian) statistical process with standard deviation $sigma_n$.

Equation 1B.

$$S^*(i) = r_s S^*(i-1) + Phi(i-1) \text{ [Appendix A—Reference 2]}$$

where:
$S^*(i)$ = the desired signal for pixel i given by a Markov random process, with standard deviation $sigma_s$, and
$Phi \sim N(0, sigma_s^2(1-r_s^2))$ = zero mean, non-correlated, normally distributed (Gaussian) statistical process with standard deviation $sigma_x(1-r_s^2)^{\frac{1}{2}}$; and
$r_s$ = correlation coefficient of $S^*(i)$.

Equation 2.

$$S(i) = r_s S^*(i-1) + (1-r_s)\mu_s \text{ [Appendix A—Reference 8]}$$

where:
$S(i)$ = Minimum mean square error recursive estimate of $S(i)$;
$S^*(i-1)$ = Previous Markov process outcome defined in Equation 1B;
$r_s$ = correlation coefficient of the process $S^*(i)$; and
$\mu_s$ = mean value of the process $S^*(i)$.

Equation 3A.

$$S_+(i) = S_+(i-1) + K_+(i)d_+(i)$$

where:
$d_+(i) = X(i) - S_+(i-1)$ = local directional measure of $sigma_s$ (and edge signal strength) as defined in Equation 1B, and
$K_+(i)$ = steady state estimation gain parameter as defined in Equation 4, for given $r_s$ and snr with:

$$snr = \left(\frac{d_+(i)}{sigma_n}\right)^2$$

Equation 3B.

$$S_-(i) = S_-(i+1) + K_-(i)d_-(i)$$

where:
$d_-(i) = X(i) - S_-(i+1)$ = local directional measure of $sigma_s$ (and edge signal strength) as defined in Equation 1B, and
$K_-(i)$ = steady state estimation gain parameter as defined in Equation 4, for given $r$, and snr with:

$$snr = \left(\frac{d_-(i)}{sigma_n}\right)^2$$

Equation 4.

$$K(j) = \frac{r_s^2 K(j-1) + snr(1-r_s^2)}{r_s^2 K(j-1) + snr(1-r_s^2) + 1}$$

where:
$K(j)$ = Kalman estimation gain parameter at iteration j, and $$snr = \left(\frac{sigma_s}{sigma_n}\right)^2$$

with:
$sigma_s$ = as defined in Equation 1B,
$sigma_n$ = as defined in Equation 1A, and
$r_s$ = as defined in Equation 2.

Equation 5.

$$K(0) = \frac{snr}{snr + 1}$$

where:
snr = as defined in Equation 4.

Equation 6.

$$d_{+-}(i) = S_+(i-1) - S_-(i+1)$$

Equation 7.

$$S_{+-}(i) = 0.5[S_+(i-1) + S_-(i+1) + K_{+-}(i)(d_{+-}(i) + d_-(i))]$$

where:
$K_{+-}(i)$ = steady state Kalman estimation gain parameter as defined in Equation 4, for given $r_s$ and snr, with:

$$snr = \left(\frac{d_{+-}(i)}{sigma_n}\right)^2$$

where
$d_{+-}(i)$ = as defined in Equation 6.

Equation 8.

$$\text{Sum1}(i) = d_+(i) + d_-(i) = 2X(i) - S_+(i-1) - S_{--}(i+1)$$

Equation 9.

$$d_{+-}{}^m(i) = \text{MINIMUM}(|\text{Sum1}(i)|, |d_{+-}(i)|)$$

where:
Sum1(i) = as defined in Equation 8, and
$d_{+-}(i)$ = as defined in Equation 6.
Equation 10.

$$S_+{}^v(l-1,i) = S_+{}^v(l-2,i) + K_+{}^v(l-1,i)d_+{}^v(l-1,i)$$

Equation 11.

$$d_+{}^v(l,i) = S_{+-}{}^h(l,i) - S_+{}^v(l-1,i)$$

Equation 12.

$$S_-{}^v(l+1,i) = S_{+-}{}^v(l+1,i)$$

Equation 13.

$$d_-{}^v(l,i) = S_{+-}{}^h(l,i) - S_{+-}{}^h(l+1,i)$$

Equation 14.

$$d_{+-}{}^v(l,i) = S_+{}^v(l-1,i) - S_-{}^v(l+1,i)$$

Equation 15.

$$S_{+-}{}^v(l,i) = 0.5[S_+{}^v(l-1,i) + S_-{}^v(l+1,i) + K_{+-}{}^v(l,i)(d_+{}^v(l,i) + d_-{}^v(l,i))]$$

where:
$K_{+-}{}^v(l,i)$ = steady state Kalman estimation gain parameter as defined in Equation 4, for given $r_s$ and snr, with:

$$snr = \left(\frac{d_{+-}{}^v(l,i)}{\text{sigma}_n}\right)^2$$

where
$d_{+-}{}^v(l, i)$ = as defined in Equation 14.
Equation 16.

$$a_{+-}{}^h(l,i) = X(l,i) - S_{+-}{}^h(l,i)$$

Equation 17.

$$S_{+-}{}^\sim(l,i) = S_{+-}{}^v(l,i) + g(l,i)a_{+-}{}^h(l,i)$$

Equation 18.

$$S^3(l,i) = \tfrac{1}{3}[S_{+-}{}^{h,3}(l-1,i-1) + S_{+-}{}^{h,3}(l-1,i) + S_{+-}{}^{h,3}(l-1,i+1) + K_+{}^{v1}(l,i)d_+{}^{v1}(l,i) + K_+{}^{v2}(l,i)d_+{}^{v2}(l,i) + K_+{}^{v3}(l,i)d_+{}^{v3}(l,i)]$$

where:
$K_+{}^{v1}(l,i)$ = steady state Kalman estimation gain parameter as defined in Equation 4, for given $r_s$ and snr, with:

$$snr = \left(\frac{d_+^{v1}(l,i)}{\text{sigma}_n}\right)^2$$

where
$d_+{}^{v1}(l,i) = X(l,i) - S_{+-}{}^{h,3}(l-1,i-1)$, and
$K_+{}^{v2}(l,i)$ = steady state Kalman estimation gain parameter as defined in Equation 4, for given $r_s$ and snr, with:

$$snr = \left(\frac{d_+^{v2}(l,i)}{\text{sigma}_n}\right)^2$$

where
$d_+{}^{v2}(l,i) = X(l,i) - S_{+-}{}^{h,3}(l-1,i)$, and
$K_+{}^{v3}(l,i)$ = steady state Kalman estimation gain parameter as defined in Equation 4, for given $r_s$ and snr, with:

$$snr = \left(\frac{d_+^{v3}(l,i)}{\text{sigma}_n}\right)^2$$

where
$d_+{}^{v3}(l,i) = X(l,i) - S_{+-}{}^{h,3}(l-1,i+1)$.
Equation 19.

$$S_+{}^{h,3}(l,i) = S_+{}^{h,3}(l, i-1) + K_+{}^{h,3}(l,i)d_+{}^{h,3}(l,i)$$

where:
$K_+{}^{h,3}(l, i)$ = steady state Kalman estimation gain parameter as defined in Equation 4, for given $r_s$ and snr, with:

$$snr = \left(\frac{d_+^{h,3}(l,i)}{\text{sigma}_n}\right)^2$$

where
$d_+{}^{h,3}(l,i) = S^3(l,i) - S_+{}^{h,3}(l,i-1)$.
Equation 20.

$$S_-{}^{h,3}(l,i) = S_-{}^{h,3}(l,i+1) + K_-{}^{h,3}(l,i)d_-{}^{h,3}(l,i)$$

where:
$K_-{}^{h,3}(l,i)$ = steady state Kalman estimation gain parameter as defined in Equation 4, for given $r_s$ and snr, with:

$$snr = \left(\frac{d_-^{h,3}(l,i)}{\text{sigma}_n}\right)^2$$

where
$d_-{}^{h,3}(l,i) = S^3(l,i) - S_-{}^{h,3}(l,i+1)$.
Equation 21.

$$d_{+-}{}^{h,3}(l,i) = S_+{}^{h,3}(l,i-1) - S_-{}^{h,3}(l,i+1)$$

where:
$S_+{}^{h,3}(l, i-1)$ = as defined in Equation 19, and
$S_-{}^{h,3}(l, i+1)$ = as defined in Equation 20.
Equation 22.

$$S_{+-}{}^{h,3}(l,i) = 0.5[S_+{}^{h,3}(l,i-1) + S_-{}^{h,3}(l,i+1) + K_{+-}{}^{h,3}(l,i)(d_+{}^{h,3}(l,i) + d_-{}^{h,3}(l,i))]$$

where:
$K_{+-}^{h,3}(l,i)$ = steady state Kalman estimation gain parameter as defined in Equation 4, for given $r_s$ and snr, with:

$$snr = \left(\frac{d_{+-}^{h,3}(l,i)}{sigma_n}\right)^2$$

where
$d_{+-}^{h,3}(l,i)$ = as defined in Equation 21.
Equation 23.

IF
$(|Sum1^{h,3}(l-1,i) + Sum1^{h,3}(l-2,i-1)| > \text{Threshold1 OR}$
$|Sum1^{h,3}(l-1,i) + Sum1^{h,3}(l-2,i)| > \text{Threshold2 OR}$
$|Sum1^{h,3}(l-1,i) + Sum1^{h,3}(l-2,i+1)| > \text{Threshold3})$
THEN
$d_{+-}^{oh,3}(l-1,i) = d_{+-}^{h,3}(l-1,i) + \text{OFFSET}$
ELSE
$d_{+-}^{oh,3}(l-1,i) = d_{+-}^{h,3}(l-1,i)$
where:
$Sum1^{h,3}(l,i) = d_{+-}^{h,3}(l,i) + d_{-+}^{h,3}(l,i);$
$d_{+-}^{h,3}(l,i) = $ as defined in Equation 21,
and
OFFSET, Threshold1, Threshold2 & Threshold3 are preset constants or signal dependant parameters.

Equation 24.

$$S_+^t(l,i,m) = S_+^t(l,i,m-1) + K_+^t(l,i,m)d_+^t(l,i,m)$$

where:
$K_+^t(l,i,m)$ = steady state Kalman estimation gain parameter as defined in Equation 4, for given $r_s$ and snr, with:

$$snr = \left(\frac{d_+^t(l,i,m)}{sigma_n}\right)^2$$

where
$d_+^t(l,i,m) = X(l,i,m) - S_+^t(l,i,m-1)$.
Equation 25.

$$S_+^t(l,i,m-1) = S_{+-}^t(l,i,m-1)$$

Equation 26.

$$d_+^t(l,i,m) = X(l,i,m) - S_+^t(l,i,m-1)$$

Equation 27.

$$S_-^t(l,i,m+1) = X(l,i,m+1)$$

Equation 28.

$$d_-^t(l,i,m) = X(l,i,m) - X(l,i,m+1)$$

Equation 29.

$$d_{+-}^t(l,i,m) = S_+^t(l,i,m-1) - S_-^t(l,i,m+1)$$

Equation 30.

$$S_{+-}^t(l,i,m) = 0.5[S_+^t(l,i,m-1) + S_-^t(l,i,m+1) + K_{+-}^t(l,i,m)(d_+^t(l,i,m) + d_-^t(l,i,m))]$$

where:

$K_{+-}^t(l,i,m)$ = steady state Kalman estimation gain parameter as defined in Equation 4, for given $r_s$ and snr, with:

$$snr = \left(\frac{d_{+-}^t(l,i,m)}{sigma_n}\right)^2$$

where
$d_{+-}^t(l,i,m)$ = as defined in Equation 29.

I claim:

1. Apparatus for one-directional time domain smoothing of a current image which was preceded by a sequence of images, the apparatus comprising:
   apparatus for computing a difference function between the raw value of an individual pixel of the current image and a smoothed preceding image value corresponding to at least one pixels of at least one preceding image; and
   apparatus for generating a smoothed pixel value for the individual pixel of the current image by computing a weighted sum of the smoothed preceding image value and of the raw value of the individual pixel of the current image wherein the weights are a function of said difference function and of at least one characteristic of at least a portion of the current image other than the difference between the individual pixel value and at least one pixels of at least one preceding image.

2. A method for one-directional time domain smoothing of a current image which was preceded by a sequence of images, the method comprising:
   computing a difference function between the raw value of an individual pixel of the current image and a smoothed preceding image value corresponding to at least one pixels of at least one preceding image; and
   generating a smoothed preceding image pixel value for the individual pixel of the current image by computing a weighted sum of the smoothed value and of the raw value of the individual pixel of the current image wherein the weights are a function of said difference function and of at least one characteristic of at least a portion of the current image other than the difference between the individual pixel value and at least one pixels of at least one preceding image.

3. A method according to claim 2 wherein said at least one characteristic comprises the location of boundaries of blocks employed for block transform image coding.

4. A method according to claim 2 wherein said at least one characteristic comprises a local average of image brightness.

5. A method according to claim 2 and also comprising:
   storing the current image; and
   generating a smoothed pixel value for at least one individual pixel in the current image based on:
   at least one smoothed pixel value of said current image; and
   at least a portion of an image following said current image in a temporal sequence.

6. A method according to claim 5 and also comprising spatially smoothing the following image and wherein the smoothed current image pixel value is based on at least one spatially smoothed portion of said following image.

7. A method for acuity-preserving image smoothing comprising:

proceeding along at least a portion of a first dimension of received image pixels in a first direction and recursively computing a first sequence of estimated pixel values from the received image pixels defined along the first direction;

proceeding along at least a portion of the first dimension of received image pixels in a second direction and recursively computing a second sequence of estimated pixel values from the received image pixels defined along the second direction; and for at least one individual pixel along the first dimension, computing an improved estimated pixel value for the individual pixel based on a data dependent combination of at least estimated pixel values in the first and second sequences.

8. A method according to claim 7 wherein, for an individual pixel in the first sequence, said proceeding and computing comprises:

computing a difference value between the received image pixel and an adjacently preceding estimated pixel value in the first sequence;

employing at least the received image pixel and at least one preceding estimated pixel values in the first sequence to estimate a first directional signal to noise ratio;

generating an adjusted difference value to reflect the first directional signal to noise ratio; and employing the adjusted difference value to update an adjacently preceding estimated pixel value, thereby to compute the estimated pixel value of the individual pixel.

9. A method according to claim 8 wherein the signal to noise ratio depends on locally weighted signal to noise ratio estimates of at least one pixel in the vicinity of the individual pixel.

10. A method according to claim 9 wherein the vicinity is included within a coding block boundary.

11. A method according to claim 7 wherein said computing an estimated pixel value comprises:

computing a difference value between the received image pixel and a function of at least adjacently preceding estimated pixel values in the first and second sequences;

employing preceding estimated pixel values in the first and second sequences to estimate a two-directional signal to noise ratio;

adjusting the difference value to reflect the signal to noise ratio; and employing the adjusted difference value to update a function of at least adjacently preceding estimated pixel values in the first and second sequences, thereby to compute the improved estimated pixel value of the individual pixel.

12. A method according to claim 11 wherein the signal to noise ratio depends on locally weighted signal to noise ratio estimates of at least one pixel in the vicinity of the individual pixel.

13. A method according to claim 7 wherein the received image pixels comprise estimated pixel values and each individual estimated pixel value is computed by combining at least three previous estimated pixel values arranged along three respective dimensions relative to the individual estimated pixel value.

14. A method according to claim 7 and also comprising:

repeating, for at least a second dimension of received image pixels, said proceeding in first and second directions and said computing an improved estimated pixel value, thereby to compute at least one additional improved estimated pixel value for each individual pixel; and combining the at least two improved estimated pixel values, thereby to obtain a further improved at least two-dimensional estimated pixel value.

15. A method according to claim 7 and also comprising:

performing the proceeding and the improved estimated pixel value computation at least once more, using a second dimension as said first dimension.

16. A method according to claim 15 and also comprising:

adjusting outputs of the proceeding using the second dimension and of the improved estimated pixel value computation using the second dimension in order to reflect the difference between the received image and outputs of the proceeding using the first dimension and of the improved estimated pixel value computation using the first dimension.

17. A method according to claim 7 wherein the received image defines a second dimension thereof and a scanning direction in which the image is received along the second dimension, the method also comprising:

proceeding along at least a portion of the second dimension of received image pixels in the scanned direction and computing a sequence of second dimension estimated pixel values from the improved estimated pixel values of the first dimension; and for each individual pixel along the second dimension, comparing an adjacently preceding second dimension estimated pixel value in the sequence of second dimension estimated pixel values and an improved estimated pixel value of the first dimension which adjacently proceeds the individual pixel along the second dimension, thereby to compute a further improved estimated pixel value for the individual pixel.

18. A method according to claim 17 and also comprising:

adjusting outputs of the proceeding using the second dimension and of the improved estimated pixel value computation using the second dimension in order to reflect the difference between the received image and outputs of the proceeding using the first dimension and of the improved estimated pixel value computation using the first dimension.

19. A method according to claim 7 and also comprising:

adjusting outputs of each estimated pixel value computation to preserve narrow elongated contours.

20. A method according to claim 7 wherein said first dimension comprises a temporal dimension.

21. A method according to claim 7 wherein said first dimension comprises a spatial dimension.

22. A method according to claim 7 and also comprising imaging an image using an electronic imager, thereby to define the received image pixels.

23. A method according to claim 7 and also comprising scanning an image using an electronic scanner, thereby to define the received image pixels.

24. A method according to claim 7 and also comprising receiving said received image pixels from a video system.

25. A method according to claim 7 wherein recursively computing the first sequence comprises computing at least one data dependent combination of received image pixels.

26. A method according to claim 25 wherein recursively computing the second sequence comprises computing at least one data dependent combination of received image pixels.

27. A method according to claim 7 wherein said data dependent combination comprises an image-dependent weighted sum in which the weights depend on at least a portion of the image.

28. A method according to claim 7 wherein said data on which said combination depends comprises the location of boundaries of blocks employed for block transform image coding.

29. A method according to claim 7 wherein said data on which said combination depends comprises a local average of image brightness.

30. Apparatus for acuity-preserving image smoothing comprising:
- a first-direction recursive pixel value estimator operative to proceed along at least a portion of a first dimension of received image pixels in a first direction and to recursively compute a first sequence of estimated pixel values from the received image pixels defined along the first direction;
- a second-direction recursive pixel value estimator operative to proceed along at least a portion of the first dimension of received image pixels in a second direction and to recursively compute a second sequence of estimated pixel values from the received image pixels defined along the second direction; and
- a data dependent pixel value estimator operative, for at least one individual pixel along the first dimension, to compute an improved estimated pixel value for the individual pixel based on a data dependent combination of at least estimated pixel values in the first and second sequences.

31. Apparatus according to claim 30 wherein, for an individual pixel in the first sequence, said first-direction pixel value estimator comprises:
- an estimate-received value difference computer operative to compute a difference value between the received image pixel and an adjacently preceding estimated pixel value in the first sequence;
- an SNR ratio estimator operative to employ at least the received image pixel and at least one preceding estimated pixel values in the first sequence to estimate a first directional signal to noise ratio;
- a difference adjuster operative to generate an adjusted difference value to reflect the first directional signal to noise ratio; and
- a pixel value estimator operative to employ the adjusted difference value to update an adjacently preceding estimated pixel value, thereby to compute the estimated pixel value of the individual pixel.

32. Apparatus according to claim 30 wherein said data dependent pixel value estimator comprises:
- an estimate-received value difference computer operative to compute a difference value between the received image pixel and a function of at least adjacently preceding estimated pixel values in the first and second sequences;
- an SNR ratio estimator operative to employ preceding estimated pixel values in the first and second sequences to estimate a two-directional signal to noise ratio;
- a difference adjuster operative to adjust the difference value to reflect the signal to noise ratio; and
- a pixel value estimator operative to employ the adjusted difference value to update a function of at least adjacently preceding estimated pixel values in the first and second sequences, thereby to compute the improved estimated pixel value of the individual pixel.

* * * * *